(12) United States Patent
Parvulescu et al.

(10) Patent No.: US 10,434,503 B2
(45) Date of Patent: Oct. 8, 2019

(54) MOLDING FOR A HYDROPHOBIC ZEOLITIC MATERIAL AND PROCESS FOR ITS PRODUCTION

(71) Applicant: BASF SE, Ludwigshafen (DE)

(72) Inventors: Andrei-Nicolae Parvulescu, Ruppertsberg (DE); Ulrich Mueller, Neustadt (DE); Hans-Juergen Luetzel, Boehl-Iggelheim (DE); Joaquim Henrique Teles, Waldsee (DE); Dominic Riedel, Lampertheim (DE); Bianca Seelig, Milan (IT); Daniel Urbanczyk, Griesheim (DE); Ulrike Wegerle, Worms (DE); Michael Hesse, Worms (DE); Andreas Walch, Schwaigern (DE); Volker Bendig, Limburgerhof (DE); Veit Stegmann, Mannheim (DE); Henning Althoefer, Wachenheim (DE); Boris Gaspar, Ludwigshafen (DE); Frank Stallmach, Markkleeberg (DE); Anne Kristin Pusch, Leipzig (DE)

(73) Assignee: BASF SE, Ludwigshafen (DE)

( * ) Notice: Subject to any disclaimer, the term of this patent is extended or adjusted under 35 U.S.C. 154(b) by 326 days.

(21) Appl. No.: 15/030,754

(22) PCT Filed: Oct. 22, 2014

(86) PCT No.: PCT/EP2014/072609
§ 371 (c)(1),
(2) Date: Apr. 20, 2016

(87) PCT Pub. No.: WO2015/059171
PCT Pub. Date: Apr. 30, 2015

(65) Prior Publication Data
US 2016/0250624 A1 Sep. 1, 2016

(30) Foreign Application Priority Data
Oct. 23, 2013 (EP) .................................... 13189907

(51) Int. Cl.
| | | |
|---|---|---|
| *B01J 20/18* | (2006.01) | |
| *B01J 29/89* | (2006.01) | |
| *C01B 39/40* | (2006.01) | |
| *B01J 29/40* | (2006.01) | |
| *B01J 39/14* | (2006.01) | |
| *B01J 29/035* | (2006.01) | |
| *B01J 35/10* | (2006.01) | |
| *B01J 37/00* | (2006.01) | |

(Continued)

(52) U.S. Cl.
CPC ............. *B01J 29/89* (2013.01); *B01J 20/183* (2013.01); *B01J 20/2803* (2013.01); *B01J 20/28011* (2013.01); *B01J 20/28042* (2013.01); *B01J 20/28059* (2013.01); *B01J 20/28061* (2013.01); *B01J 20/28064* (2013.01); *B01J 20/28071* (2013.01); *B01J 20/28073* (2013.01); *B01J 20/28076* (2013.01); *B01J 20/3007* (2013.01); *B01J 20/3014* (2013.01); *B01J 20/3085* (2013.01); *B01J 29/035* (2013.01); *B01J 29/405* (2013.01); *B01J 35/002* (2013.01); *B01J 35/10* (2013.01); *B01J 35/1014* (2013.01); *B01J 35/1019* (2013.01); *B01J 35/1023* (2013.01); *B01J 35/1038* (2013.01); *B01J 35/1042* (2013.01); *B01J 35/1047* (2013.01);

(Continued)

(58) Field of Classification Search
CPC ...... B01J 29/89; B01J 20/183; B01J 20/2803; B01J 20/28042; B01J 20/28011; B01J 20/28059; B01J 20/28061; B01J 20/28064; B01J 20/28071; B01J 20/28073; B01J 20/28076; B01J 29/405; B01J 37/0018; B01J 2229/183; B01J 2229/42; C01P 2002/74; C01P 2002/86; C01P 2006/21; C01B 39/026; C01B 39/085; C01B 39/40
See application file for complete search history.

(56) References Cited

U.S. PATENT DOCUMENTS

| | | | |
|---|---|---|---|
| 6,008,389 A | 12/1999 | Grosch et al. | |
| 7,589,041 B2 * | 9/2009 | Ying .................. | B01J 20/18 502/63 |

(Continued)

FOREIGN PATENT DOCUMENTS

| | | |
|---|---|---|
| JP | 05 138016 | 6/1993 |
| WO | WO 99/28029 A1 | 6/1999 |

(Continued)

OTHER PUBLICATIONS

Image from the Royal Chemical Society, Downloaded May 5, 2018, 29Si MAS NMR for TS-1 Figure A (b) (2018).*

(Continued)

*Primary Examiner* — David M Brunsman
(74) *Attorney, Agent, or Firm* — Oblon, McClelland, Maier & Neustadt, L.L.P.

(57) ABSTRACT

The present invention relates to A process for the production of a molding, comprising (I) providing a zeolitic material; (II) mixing the zeolitic material provided in step (I) with one or more binders; (III) kneading of the mixture obtained in step (II); (IV) molding of the kneaded mixture obtained in step (III) to obtain one or more moldings; (V) drying of the one or more moldings obtained in step (IV); and (VI) calcining of the dried molding obtained in step (V); wherein the zeolitic material provided in step (I) displays a water adsorption ranging from 1 to 15 wt.-% when exposed to a relative humidity of 85%, as well as to a molding obtainable or obtained according to the inventive process in addition to a molding per se and to their respective use.

28 Claims, No Drawings

(51) Int. Cl.
    *C01B 39/08* (2006.01)
    *C01B 39/02* (2006.01)
    *B01J 20/28* (2006.01)
    *B01J 20/30* (2006.01)
    *B01J 35/00* (2006.01)
    *B01J 37/10* (2006.01)
    *B01J 35/02* (2006.01)

(52) U.S. Cl.
    CPC ........... *B01J 37/0018* (2013.01); *B01J 39/14* (2013.01); *C01B 39/026* (2013.01); *C01B 39/085* (2013.01); *C01B 39/40* (2013.01); *B01J 35/023* (2013.01); *B01J 37/10* (2013.01); *B01J 2229/183* (2013.01); *B01J 2229/36* (2013.01); *B01J 2229/40* (2013.01); *B01J 2229/42* (2013.01); *C01P 2002/74* (2013.01); *C01P 2002/86* (2013.01); *C01P 2006/21* (2013.01)

(56) References Cited

U.S. PATENT DOCUMENTS

| | | |
|---|---|---|
| 2004/0054199 A1 | 3/2004 | Muller et al. |
| 2004/0229747 A1 | 11/2004 | Weisbeck et al. |
| 2005/0085646 A1 | 4/2005 | Muller et al. |
| 2006/0167286 A1 | 7/2006 | Mueller et al. |
| 2007/0099299 A1 | 5/2007 | Simon et al. |
| 2007/0135637 A1 | 6/2007 | Bosch et al. |
| 2008/0015371 A1 | 1/2008 | Weisbeck et al. |
| 2011/0130579 A1 | 6/2011 | Müller et al. |
| 2012/0258852 A1* | 10/2012 | Martinez ............... B01J 29/041 502/60 |

FOREIGN PATENT DOCUMENTS

| | | |
|---|---|---|
| WO | WO 2012/076543 A1 | 6/2012 |
| WO | WO 2013/117536 A2 | 8/2013 |
| WO | WO 2013/160345 A1 | 10/2013 |
| WO | WO 2014/076625 A1 | 5/2014 |

OTHER PUBLICATIONS

Verified Synthesis of Zeolitic Materials 2nd Revised Edition, Robson, ed. 2001 (Year: 2001).*
International Search Report and Written Opinion dated Jan. 19, 2015 in PCT/EP2014/072609.
S. P. Mirajkar, et al., "Sorption Properties of Titanium Silicate Molecular Sieves" The Journal of Physical Chemistry, vol. 96, No. 7, XP055108530, 1992, pp. 3073-3079.
J. Kornatowski, et al., "Vanadium derivatives of MFI type molecular sieves investigated by sorption and catalytic tests" Studies in Surface Science and Catalysis, vol. 105, XP009177038, 1997, pp. 1795-1802.
Wha-Seung Ahn, et al., "Extensions in the synthesis and catalytic application of titanium silicalite-1" Catalysis Surveys from Asia, vol. 9, No. 1, XP0192275548, Jan. 2005, pp. 51-60.
Sunyoung Park, et al., "Direct epoxidation of propylene with hydrogen peroxide over TS-1 catalysts: Effect of hydrophobicity of the catalysts" Catalysis Communications, vol. 9, XP025348285, 2008, pp. 2485-2488.

* cited by examiner

MOLDING FOR A HYDROPHOBIC ZEOLITIC MATERIAL AND PROCESS FOR ITS PRODUCTION

The present invention relates to a process for the production of a molding containing hydrophobic zeolitic materials, and to a process for the preparation thereof. The present invention further relates to a molding containing a hydrophobic zeolitic material, and to the use of said molding in specific applications, and in particular in catalytic processes.

INTRODUCTION

Due to the crystallinity of zeolitic materials in general, it is common in the art to produce shaped bodies thereof not only for ease of handling but also for avoiding physical deterioration of the zeolitic materials in applications in which these are used, and in particular in applications requiring a certain operation resistance due to physical wear of the materials in specific process steps where the zeolitic materials as such would be subject to agitation. Furthermore, moldings of zeolitic materials are often required in catalytic processes wherein a dilution of the zeolitic materials is further required for better control of the catalytic activity by avoiding heat buildup which may occur when using a high concentration of the zeolitic material. Thus, in the field of catalysis, the use of moldings plays an important role for providing catalytically active zeolitic materials in a physical state in which optimal control of their activity by proper dilution in a specific volume coupled with heat dissipation means in the case of exothermic reactions allows for the finetuning of the catalytic process.

Thus, a large variety of catalyzed reactions is known in which the use of specific moldings containing the catalytically active zeolitic materials plays a crucial role for optimal control of the reaction parameters. US 2007/0135637 A1 for example relates to a zeolite material of the pentasil type which is provided in the form of a molding for use in the preparation of tetraethylene diamine from piperazine and ethylene diamine. WO 99/28029 A1, on the other hand, concerns an epoxidation catalyst based on titanium zeolite which is used in the form of extruded granules for the synthesis of oxyranes. Similarly, WO 2012/076543 A1 concerns a continuous process for the production of propylene oxide in the presence of a titanium silicalite-1 catalyst which is processed into a shaped body prior to being used in the aforementioned process.

The known processes for the production of moldings containing zeolitic materials however tend to show a relatively narrow tolerance with respect to the catalytically active components which may be incorporated in said moldings such that they are generally restricted to the use of zeolites and materials of which the physical properties are comparable to those typically found in zeolitic materials. In particular, already small variations in the zeolitic materials physical properties may already prevent the production of a molding according to conventional means.

A need therefore exists for the provision of moldings and processes for their preparation which are adapted to other catalytically active materials having different physical properties than those generally observed in zeolites, in particular for allowing the production of moldings containing novel and yet unknown zeolitic materials for use in catalytic applications necessitating the use of moldings, for which the use of moldings would prove advantageous for providing an improved environment for the zeolitic species, in particular relative to their catalytic activity and abrasion resistance. This applies in particular since the use of shaped bodies in a variety of catalyzed reactions allow for the gradual variation and thus for the optimization of the chemical and physical properties of the moldings containing zeolitic materials for making it possible to fine-tune the resulting product in function of the specific requirements needed for a given application.

DETAILED DESCRIPTION

It is therefore the object of the present invention to provide a process for the production of a molding which may employ a wider variety of zeolitic materials. In particular, it is the object of the present invention to provide a methodology for the preparation of moldings for zeolitic materials which due to their particular physical and chemical properties either could not be processed to shaped bodies using the methodologies known in the art, or which only displayed poor results in catalysis after having been processed to a shaped body compared to their catalytic properties when employed as such in zeolitic form. Consequently, besides providing a process for the production of a molding which allows access to a larger number of zeolitic materials, the present invention also aims to improve the catalytic performance of zeolitic materials which due to their physical and chemical particular properties are not suited for use in molded bodies as presently known in the art.

Therefore, the present invention relates to a process for the production of a molding, comprising
 (I) providing a zeolitic material;
 (II) mixing the zeolitic material provided in step (I) with one or more binders;
 (III) kneading of the mixture obtained in step (II);
 (IV) molding of the kneaded mixture obtained in step (III) to obtain one or more moldings;
 (V) drying of the one or more moldings obtained in step (IV); and
 (VI) calcining of the dried molding obtained in step (V);
wherein the zeolitic material provided in step (I) displays a water adsorption ranging from 1 to 15 wt.-% when exposed to a relative humidity of 85%, wherein preferably the water adsorption ranges from 2 to 14 wt.-%, more preferably from 2.5 to 11 wt.-%, more preferably from 3 to 10 wt.-%, more preferably from 4 to 9 wt.-%, more preferably from 5 to 8.7 wt.-%, more preferably from 7 to 8.4 wt.-%, and more preferably from 7.5 to 8.2 wt.-%.

It is herewith noted that within the meaning of the present invention, and in particular with respect to the particular and preferred embodiments defined in the present application, the term "comprising" is alternatively used as meaning "consisting of", i.e. as specifically and explicitly disclosing corresponding embodiments wherein the subject-matter defined as comprising specific features actually consists of said specific features. According to the present invention, however, the term "comprising" is preferably employed according to its common definition as not limiting the subject-matter to the sole feature or features which it is explicitly stated as comprising.

Thus, it has surprisingly been found that moldings may be prepared using zeolitic materials having exceptional physical characteristics, in particular relative to their hydrophobicity, i.e. to their water adsorption properties which lie outside the range of water adsorption capacities normally observed in zeolitic materials. In particular, it has quite unexpectedly been found that a process for the preparation of a molding may be provided wherein zeolitic materials used therein display a water adsorption falling below the water adsorption capacities typically observed in zeolites, such that a molding may be provided of which the zeolitic materials contained therein display a high hydrophobicity. Therefore, it has surprisingly been found that, according to the present invention, a molding may be provided having exceptional physical and chemical properties due to the zeolitic materials used therein, thus affording the possibility of providing shaped bodies for novel applications and in particular catalytically active moldings displaying novel catalytic activities and/or selectivities and/or resistance to aging and therefore improved times on stream. Consequently, the inventive process involves the use of specific zeolitic materials displaying an exceptionally high hydrophobicity such that their water adsorption is comprised in the range of from 1 to 15 wt.-% when exposed to a relative humidity of 85%. Within the meaning of the present invention, a specific value of relative humidity is not particularly restricting with respect to the atmosphere which displays said specific value in relative humidity such that in principle the value may relate to any suitable atmosphere displaying said value in relative humidity such as e.g. air or an atmosphere of an inert gas such as nitrogen, argon, or mixtures thereof. According to the present invention it is however preferred that a specific relative humidity refers to the relative humidity of an atmosphere selected among the group consisting of air, nitrogen, argon, and mixtures of two or more thereof, wherein more preferably the specific relative humidity refers to an atmosphere of nitrogen and/or argon displaying said level of relative humidity, more preferably to an atmosphere of nitrogen displaying said specific level in relative humidity.

Accordingly, the zeolitic materials employed in the inventive process are not particularly restricted provided that their hydrophobicity falls within the aforementioned range relative to their water adsorption properties, such that in principle any conceivable zeolitic material displaying such properties may be used therein. According to the inventive process, it is however preferred that the water adsorption of the zeolitic material provided in step (I) ranges from 2 to 14 wt.-% when exposed to a relative humidity of 85%, wherein more preferably the water adsorption ranges from 2.5 to 11 wt.-%, more preferably from 3 to 10 wt.-%, more preferably from 4 to 9 wt.-%, more preferably from 5 to 8.7 wt.-%, and more preferably from 7 to 8.4 wt.-%. According to the inventive process, it is particularly preferred that the water adsorption of the zeolitic material provided in step (I) lies in the range of from 7.5 to 8.2 wt.-% when exposed to a relative humidity of 85%.

According to the inventive process for the production of a molding, the zeolitic material provided in step (I) is mixed with one or more binders. In principle, there is no particular restriction as to the one or more binders which may be used in the inventive process provided that these are capable of forming a matrix in which the zeolitic material is contained in a dispersed manner. Thus, it is preferred according to the inventive process that the chemical and/or physical interaction between the zeolitic material and the one or more binders upon mixing in step (II) is such that an even distribution of the zeolitic material in the binder matrix may be achieved by mixing in step (II) and subsequent kneading in step (III) of the mixture obtained in step (II) for obtaining a molding of the kneaded mixture obtained in step (III) upon molding thereof in step (IV) wherein the one or more moldings display an even distribution of the zeolitic material in the binder matrix. Furthermore, the one or more binders are selected from the group consisting of inorganic binders, wherein in particular the one or more binders preferably used in the inventive process comprise one or more sources of a metal oxide and/or of a metalloid oxide. As regards the preferred metal and/or metalloid oxide which may be comprised in the one or more binders, no particular restriction applies relative to the metals and/or metalloids which may be employed provided that one or more moldings may be obtained from the mixture obtained in step (II) after kneading thereof in step (III) and molding of the kneaded mixture in step (IV).

Thus, by way of example, the metal oxide and/or metalloid oxide preferably comprised in the one or more binders added in step (II) may be selected from the group consisting of silica, alumina, titania, zirconia, lanthana, magnesia, and mixtures and/or mixed oxides of two or more thereof. According to the inventive process, it is however preferred that the one or more binders comprise one or more sources of metal oxide and/or of a metalloid oxide selected from the group consisting of silica, alumina, titania, zirconia, magnesia, silica-alumina mixed oxides, silica-titania mixed oxides, silica-zirconia mixed oxides, silica-lanthana mixed oxides, silica-zirconia-lanthana mixed oxides, alumina-titania mixed oxides, alumina-zirconia mixed oxides, alumina-lanthana mixed oxides, alumina-zirconia-lanthana mixed oxides, titania-zirconia mixed oxides, and mixtures and/or mixed oxides of two or more thereof. It is, however, particularly preferred according to the inventive process that the one or more binders comprise one or more sources of a metal oxide and/or of a metalloid oxide selected from the group consisting of silica, alumina, silica-alumina mixed oxides, and mixtures of two or more thereof, wherein more preferably the one or more binders comprise one or more sources of silica, and wherein even more preferably the binder consists of one or more sources of silica.

According to the present invention it is also preferred that the one or more binders comprise one or more burn-out additives. According to the present invention, the term "burn-out additive" generally refers to any one or more compounds which are decomposed in the step of calcining the dried molding obtained in step (V) and preferably to any one or more compounds which are decomposed to gaseous components, and in particular which are decomposed to one or more gaseous components by reaction with oxygen which is preferably present in the atmosphere under which calcination in step (VI) is effected. According to the present invention it is further preferred that the one or more binders consist of one or more burn-out additives which are decomposed in the step of calcination, preferably by reaction with oxygen preferably present in the atmosphere and which calcination is effected.

As regards the one or more burn-out additives which are preferably comprised in the one or more binders, no particular restriction applies such that in principle any suitable compound or compound mixture may be employed provided that it may be decomposed in step (VI) of calcining the dried molding obtained in step (V). Thus, by way of example, the one or more burn out additives may comprise one or more carbon-containing burn-out additives, preferably one or more carbon-containing burn-out additives selected from the group consisting of carbon-containing polymers, carbohydrates, graphite, or combinations of two or more thereof, more preferably one or more carbon-containing burn-out additives selected from the group consisting of sugars and derivates thereof, starch and derivatives thereof, cellulose and derivatives thereof, and graphite, including combinations of two or more thereof, more preferably from the group consisting of sugars and alkylated derivatives thereof, starch and alkylated derivatives thereof, cellulose and alkylated derivatives thereof, and graphite, including combinations of two or more thereof, more preferably from the group consisting of sugars and methylated derivatives thereof, starch and methylated derivatives thereof, cellulose and methylated derivatives thereof, and graphite, including combinations of two or more thereof, more preferably from the group consisting of sugars and methylated derivatives thereof, cellulose and methylated derivatives thereof, and graphite, including combinations of two or more thereof, more preferably from the group consisting of cellulose and methylated derivatives thereof and/or graphite, including combinations of two or more thereof, wherein more preferably methylated cellulose derivatives and/or graphite are employed as the one or more burn-out additives, and preferably graphite. According to the present invention it is particularly preferred that the one or more binders consist of methylated cellulose derivatives and/or graphite, and preferably that the one or more binders used in the inventive process consist of graphite.

Regarding the one or more sources of silica preferably comprised in the one or more binders and of which the one or more binders even more preferably consist of, no particular restrictions apply, such that the silica may, by way of example, be selected from the group consisting of fumed silica, colloidal silica, silica-alumina, colloidal silica-alumina, and mixtures of two or more thereof. According to the inventive process it is however preferred that the one or more binders comprise and even more preferably consist of one or more compounds selected from the group consisting of fumed silica, colloidal silica, and mixtures thereof, wherein more preferably the one or more binders consist of fumed silica and/or colloidal silica, and more preferably of fumed silica or colloidal silica. In step (II) of the inventive process, the zeolitic material provided in step (I) is mixed with one or more binders. As regards the amounts in which the zeolitic material and the one or more binders are provided in step (II) for obtaining a mixture, no particular restriction applies, such that in principle any suitable weight ratio of the one or more binders to the zeolitic material (binder:zeolitic material) may be employed provided that the mixture obtained in step (II) may be kneaded in step (III) and the kneaded mixture obtained in step (III) subsequently molded in step (IV) for obtaining one or more moldings. According to the inventive process, it is however preferred that the mixture obtained in step (II) displays a weight ratio of the one or more binders to the zeolitic material comprised in the range of from 0.1 to 0.6, wherein more preferably the binder:zeolitic material weight ratio is comprised in the range of from 0.15 to 0.5, and even more preferably of from 0.2 to 0.45.

As regards the mixing of the zeolitic material with the one or more binders in step (II) of the inventive process, it is preferred that the zeolitic material and the one or more binders are further mixed with a solvent system. As regards the solvent system preferably added to the mixture in step (II), it may in principle consist of a single type of solvent or comprise one or more solvents, wherein preferably the solvent system comprises one or more hydrophilic solvents. As regards the hydrophilic solvent preferably comprised in the solvent system provided in step (II), there is in principle no particular restriction as to the hydrophilic solvent type and/or the number of hydrophilic solvents which may be comprised in the solvent system, wherein preferably the one or more hydrophilic solvents are selected from the group consisting of polar solvents, and more preferably from the group of polar protic solvents. As regards the particularly preferred polar protic solvents which may be comprised in the solvent system, these are preferably selected from the group consisting of water, alcohols, carboxylic acids, and mixtures of two or more thereof, wherein more preferably, the one or more polar protic solvents are selected from the group consisting of water, C1-C5 alcohols, C1-C5 carboxylic acids, and mixtures of two or more thereof, more preferably from the group consisting of water, C1-C4 alcohols, C1-C4 carboxylic acids, and mixtures of two or more thereof, and more preferably from the group consisting of water, C1-C3 alcohols, C1-C3 carboxylic acids, and mixtures of two or more thereof. According to the inventive process, it is particularly preferred that the one or more polar protic solvents comprised in the solvent system provided in step (II) are selected from the group consisting of water, methanol, ethanol, propanol, formic acid, acetic acid, and mixtures of two or more thereof, more preferably from the group consisting of water, ethanol, acetic acid, and mixtures of two or more thereof, wherein more preferably the solvent system comprises water and/or ethanol. It is however yet further preferred according to the inventive process that the solvent system preferably provided in step (II), in addition to the zeolitic material and the one or more binders, comprises water and even more preferably the solvent system consists of water.

With respect to preferred embodiments of the inventive process wherein a solvent system is further added to the zeolitic material and to the one or more binders in step (II), there is no particular restriction as to the amount of the solvent system which may be added provided that the mixture obtained in step (II) may be kneaded in step (III) and the kneaded mixture subsequently molded in step (IV) to obtain one or more moldings. To this effect, it is preferred according to the inventive process that the weight ratio of the solvent system to the zeolitic material (solvent system: zeolitic material) is comprised in the range of from 0.7 to 1.7, wherein more preferably the solvent system:zeolitic material weight ratio is comprised in the range of from 0.8 to 1.6, and more preferably of from 0.9 to 1.5. According to particularly preferred embodiments of the inventive process wherein a solvent system is further added to the zeolitic material and to the one or more binders in step (II), the mixture obtained in step (II) displays a solvent system: zeolitic material weight ratio comprised in the range of from 1.0 to 1.4.

According to the inventive process, it is further preferred that one or more pore forming agents are further added to the zeolitic material and the one or more binders in step (II) and even more preferably to the zeolitic material, to the one or more binders, and to the solvent system preferably added thereto. According to the present invention, there is no particular restriction as to the number and/or types of pore forming agents which may be used therein provided that the mixture obtained in step (II) may be kneaded in step (III) and the kneaded mixture subsequently molded in step (IV) to obtain one or more moldings. Thus, by way of example, the one or more pore forming agents may be selected from the group consisting of polymers, carbohydrates, graphite, and mixtures of two or more thereof, wherein preferably the one or more pore forming agents are selected from the group consisting of polymeric vinyl compounds, polyalkylene oxides, polyacrylates, polyolefins, polyamides, polyesters, cellulose and cellulose derivatives, sugars, and mixtures of two or more thereof, more preferably from the group consisting of polystyrene, C2-C3 polyalkylene oxides, cellulose derivatives, sugars, and mixtures of two or more thereof, more preferably from the group consisting of polystyrene, polyethylene oxide, C1-C2 hydroxyalkylated and/or C1-C2 alkylated cellulose derivatives, sugars, and mixtures of two or more thereof, more preferably from the group consisting of polystyrene, polyethylene oxide, hydroxyethyl methyl cellulose, and mixtures of two or more thereof. According to the inventive process, it is particularly preferred that the one or more pore forming agents added to the zeolitic material and to the one or more binders in step (II) and which preferably comprises a solvent system is selected from the group consisting of polystyrene, polyethylene oxide, hydroxyethyl methyl cellulose, and mixtures of two or more thereof, wherein it is yet further preferred that the one or more pore forming agents consist of one or more selected from the group consisting of polystyrene, polyethylene oxide, hydroxyethyl methyl cellulose, and mixtures of two or more thereof, wherein more preferably the one or more pore forming agents consist of a mixture of polystyrene, polyethylene oxide, and hydroxyethyl methyl cellulose.

As regards the preferred embodiments of the inventive process wherein the mixture in step (II) comprises one or more pore forming agents in addition to the zeolitic material and the one or more binders wherein said mixture preferably further comprises a solvent system, there is no particular restriction regarding the amount of the one or more pore forming agents which may be further added provided that the mixture obtained in step (III) may be kneaded in step (III) and subsequently molded in step (IV) for obtaining one or more moldings. According to said preferred embodiments, it is however preferred that the mixture obtained in step (II) displays a weight ratio of one or more pore forming agents to the zeolitic material (pore forming agent:zeolitic material) comprised in the range of from 0.1 to 0.7, wherein more preferably the pore forming agent:zeolitic material weight ratio is comprised in the range of from 0.15 to 0.6, more preferably from 0.2 to 0.5, and more preferably from 0.25 to 0.45. According to particularly preferred embodiments of the inventive process wherein the mixture obtained in step (II) further comprises one or more pore forming agents in addition to the zeolitic material and the one or more binders and preferably in addition to a solvent system, the weight ratio of the one or more pore forming agents to the zeolitic material is preferably comprised in the range of from 0.3 to 0.4. Same applies accordingly relative to yet further preferred embodiments of the inventive process, wherein both a solvent system and one or more pore forming agents are mixed in step (II) together with the zeolitic material and the one or more binders such that again no particular restrictions apply relative to the amounts in which the individual components are provided in the mixture provided that the mixture obtained in step (II) may be kneaded in step (III) and subsequently molded in step (IV) to obtain one or more moldings. It is however, preferred that the mixture obtained in step (II) according to said preferred embodiments displays a weight ratio of the solvent system to the one or more binders and pore forming agents to the zeolitic material (solvent system:binder and pore forming agent:zeolitic material) ranging from (0.7-1.7):(0.4-1):1, preferably from (0.8-1.6):(0.5-0.9):1, more preferably from (0.9-1.5):(0.55-0.85):1, and more preferably from (1.0-1.4):(0.6-0.8):1. According to said particularly preferred embodiments, it is yet further preferred that the mixture obtained in step (II) displays a solvent system:binder and pore forming agent:zeolitic material weight ratio ranging from (1.1-1.3):(0.65-0.75):1.

In step (VI) of the inventive process, the dried molding obtained in step (V) is calcined. As regards said calcination step, no particular restrictions apply according to the inventive process such that in principle any suitable temperature and duration may be employed in said calcination step, wherein preferably the dried molding obtained in step (V) is calcined at a temperature ranging from 350 to 850° C., more preferably from 400 to 700° C., and more preferably from 450 to 650° C. According to the inventive process, it is however particularly preferred that the dried molding obtained in step (V) is calcined at a temperature ranging from 475 to 600° C. in step (VI).

As regards the calcining of the dried molding in step (VI), there is no particular restriction as to the method or the apparatus employed for achieving the calcination. Thus, in principle, any suitable apparatus may be employed, wherein according to the inventive process a calciner is preferably used. Concerning the calciner which is preferably employed, a rotary or a static calciner may principally be used. Furthermore the calciner which is preferably employed may employ a normal current floe or a contra-flow current.

As regards the calcined molding obtained in step (VI) of the inventive process, depending on the specific application which is envisaged, the calcined molding may be subject to any one or more post-treatment steps for further optimization of the resulting product. In particular, it may be advantageous to subject the calcined molding to a treatment for improving the physical properties of the molding as such, for example with respect to its abrasion resistance. Thus, it is preferred that the inventive process further comprises a step (VII) of subjecting the calcined molding obtained in step (VI) to a hydrothermal treatment. In principle, the hydrothermal treatment may be conducted under any suitable conditions, in particular relative to the temperature and/or pressure under which said treatment is performed. Thus, the hydrothermal treatment in step (VII) may for example comprise the treatment of the calcined molding obtained in step (VI) with steam. According to the inventive process, it is however particularly preferred that the hydrothermal treatment in step (VII) is conducted under autogenous pressure. As regards the temperature under which the hydrothermal treatment in step (VI) is performed, again no particular restriction applies such that said treatment may, by way of example, be preformed at a temperature comprised in the range of from 80 to 200° C. According to the inventive process, it is however preferred that the hydrothermal treatment in step (VII) is conducted at a temperature ranging from 90 to 180° C., more preferably from 100 to 170° C., and more preferably from 110 to 160° C. According to the inventive process, it is however particularly preferred that the hydrothermal treatment in step (VII) is performed at a temperature ranging from 120 to 150° C., wherein the hydrothermal treatment is again preferably performed under autogenous pressure at these temperatures.

As regards the particularly preferred embodiments of the inventive process wherein the calcined molding obtained in step (VI) is subject in step (VII) to a hydrothermal treatment, and in particular a hydrothermal treatment under autogenous pressure, there is no particular restriction as to the solvent or solvent system comprising one or more solvents with which said hydrothermal treatment is performed. According to said particularly preferred embodiments of the inventive process, it is however preferred that the hydrothermal treatment is performed with a water containing solvent system and/or with an aqueous solution, wherein more preferably the hydrothermal treatment is performed with a solvent system comprising distilled water, wherein more preferably the solvent system employed for the hydrothermal treatment, and in particular for the hydrothermal treatment under autogenous pressure, consists of distilled water. As regards the duration of the hydrothermal treatment preferably performed in step (VII) for post-treating the calcined molding obtained in step (VI), there is no particular restriction as to the duration of said treatment which may, by way of example, be performed for a duration ranging from 1 to 48 hours. According to the inventive process, it is however preferred that the preferred hydrothermal treatment according to step (VII) is performed for a duration of from 2 to 36 hours, more preferably of from 4 to 24 hours, and even more preferably of from 5 to 12 hours. According to particularly preferred embodiments of the inventive process wherein the calcined molding obtained in step (VI) is subject to hydrothermal treatment in step (VII), the duration of the hydrothermal treatment preferably ranges from 6 to 9 hours.

As mentioned in the foregoing, there is no particular restriction relative to the zeolitic material provided in step (I) such that any one or more suitable zeolites may be comprised therein provided that hydrophobicity of the zeolitic material is such that it displays a water adsorption ranging from 1 to 15 wt.-% when exposed to a relative humidity of 85%. Thus, in principle, any conceivable one or more zeolites displaying said properties may be employed independent of their specific composition or framework type. According to the present invention it is however preferred that the zeolitic material comprises one or more zeolites having a framework structure selected among the group consisting of AEI, BEA, CHA, CDO, DDR, EMT, ERI, EUO, FAU, FER, HEU, LEV, MAZ, MEI, MEL, MFI, MFS, MOR, MOZ, MRE, MTN, MTT, MTW, MWW, NON, OFF, RRO, TON, and combinations of two or more thereof. According to the inventive process, it is further preferred that the zeolitic material provided in step (I) comprises one or more zeolites having a framework structure selected among the group consisting of BEA, CHA, CDO, FAU, FER, HEU, LEV, MEL, MFI, MOR, MWW, RRO, and combinations of two or more thereof, more preferably from the group consisting of BEA, CHA, FAU, FER, LEV, MEL, MFI, MWW, and combinations of two or more thereof, wherein more preferably the one or more zeolites have a framework structure selected among the group consisting of, MEL, MFI, MWW, and combinations of two or more thereof. It is particularly preferred according to the inventive process that the zeolitic material provided in step (I) comprises one or more zeolites, wherein more preferably the one or more zeolites have the MFI-type framework structure.

As regards the one or more zeolites having the MFI-type framework structure preferably comprised in the zeolitic material provided in step (I) of the inventive process, again, no particular restrictions apply neither with respect to the type nor with respect to the number of MFI-type zeolites which may be provided, such that, by way of example, the zeolitic material may comprise one or more zeolites of the MFI-type framework structure selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof. According to the inventive process, it is however particularly preferred that the zeolitic material provided in step (I) comprises Silicatlite and/or TS-1. According to the inventive process, it is particularly preferred that the zeolitic material provided in step (I) consists of Silicalite and/or TS-1 and preferably consists of TS-1.

In addition to the process for the production of a molding as described above, the present invention further relates to a molding per se which is obtainable by the inventive process and in particular according to any of the particular and preferred embodiments thereof as defined in the foregoing. Furthermore, the inventive process relates to a molding per se independently of the process by which it may be obtained.

In particular, the present invention further relates to a molding, preferably obtainable and/or obtained by the inventive process and in particular according to any of the particular and preferred embodiments of the inventive process defined in the foregoing, wherein said molding contains a zeolitic material displaying a water adsorption ranging from 1 to 15 wt.-% when exposed to a relative humidity of 85%.

As regards the zeolitic materials which may be employed in the inventive molding, these are not particularly restricted provided that their hydrophobicity falls within the aforementioned range relative to their water adsorption properties, such that in principle any conceivable zeolitic material displaying such properties may be used therein. According to the present invention, it is however preferred that the water adsorption of the zeolitic material contained in the inventive molding ranges from 2 to 14 wt.-% when exposed to a relative humidity of 85%, wherein more preferably the water adsorption ranges from 2.5 to 11 wt.-%, more preferably from 3 to 10 wt. %, more preferably from 4 to 9 wt.-%, more preferably from 5 to 8.7 wt.-%, and more preferably from 7 to 8.4 wt.-%. According to the present invention, it is particularly preferred that the water adsorption of the zeolitic material contained in the inventive molding lies in the range of from 7.5 to 8.2 wt.-% when exposed to a relative humidity of 85%.

Therefore, there is no particular restriction relative to the zeolitic material contained in the inventive molding such that any one or more suitable zeolites may be comprised therein provided that hydrophobicity of the zeolitic material is such that it displays a water adsorption ranging from 1 to 15 wt.-% when exposed to a relative humidity of 85%. Thus, in principle, any conceivable one or more zeolites displaying said properties may be employed independent of their specific composition or framework type. According to the present invention it is however preferred that the zeolitic material contained in the inventive molding comprises one or more zeolites having a framework structure selected among the group consisting of AEI, BEA, CHA, CDO, DDR, EMT, ERI, EUO, FAU, FER, HEU, LEV, MAZ, MEI, MEL, MFI, MFS, MOR, MOZ, MRE, MTN, MTT, MTW, MWW, NON, OFF, RRO, TON, and combinations of two or more thereof. According to the present invention, it is further preferred that the zeolitic material contained in the inventive molding comprises one or more zeolites having a framework structure selected among the group consisting of BEA, CHA, CDO, FAU, FER, HEU, LEV, MEL, MFI, MOR, MWW, RRO, and combinations of two or more thereof, more preferably from the group consisting of BEA, CHA, FAU, FER, LEV, MEL, MFI, MWW, and combinations of two or more thereof, wherein more preferably the one or more zeolites have a framework structure selected among the group consisting of, MEL, MFI, MWW, and combinations of two or more thereof. It is particularly preferred according to the present invention that the zeolitic material contained in the inventive molding comprises one or more zeolites, wherein more preferably the one or more zeolites have the MFI-type framework structure.

Although no particular restriction applies according to the present invention relative to the zeolitis material used in the inventive process and contained in the inventive molding, provided that these display a water adsorption as defined in the present application, it is preferred that the zeolitic material used in the inventive process and contained in the inventive molding are obtainable according to a process for the preparation of a zeolitic material comprising the steps of:
(1) providing a mixture comprising one or more sources for $YO_2$ and one or more alkenyltrialkylammonium cation $R^1R^2R^3R^4N^+$-containing compounds as structure directing agent; and
(2) crystallizing the mixture obtained in step (1) to obtain a zeolitic material;
wherein Y is a tetravalent element, and
wherein $R^1$, $R^2$, and $R^3$ independently from one another stand for alkyl; and
$R^4$ stands for alkenyl.

According to the present invention it is further preferred that the zeolitic material used in the inventive process and contained in the inventive molding are obtainable according to a process for the preparation of a zeolitic material according to any of the particular and preferred embodinvents of the above-mentioned process involving the use of one or more alkenyltrialkylammonium cation $R^1R^2R^3R^4N^+$-containing compounds as defined in the international application PCT/EP2013/058481 with the title "Zeolitic Materials and Methods for their Preparation using Alkenyltrialkylammonium compounds", the contents of which is accordingly incorporated by reference herewith.

Thus, it is particularly preferred according to the present invention that the zeolitic material contained in the inventive molding has an MFI-type framework structure comprising $YO_2$ and optionally comprising $X_2O_3$, wherein Y is a tetravalent element, and X is a trivalent element, said material having an X-ray diffraction pattern comprising at least the following reflections:

| Intensity (%) | Diffraction angle 2θ/° [Cu K(alpha 1)] |
|---|---|
| 55-100 | 7.66-8.20 |
| 40-75 | 8.58-9.05 |
| 92-100 | 22.81-23.34 |
| 49-58 | 23.64-24.18 |
| 16-24 | 29.64-30.21 |
| 14-25 | 44.80-45.25 |
| 16-24 | 45.26-45.67 | wherein 100% relates to the intensity of the maximum peak in the X-ray powder diffraction pattern. According to the present invention, it is further preferred that the zeolitic material displaying the aforementioned X-ray diffraction pattern comprises TS-1, wherein it is even more preferred that the zeolitic material contained in the inventive molding is TS-1.

As regards the intensity of the first reflection comprised in the range of 7.66°-8.20° 2θ, it is preferred according to the present invention that the intensity of said reflection is comprised in the range of from 70-100, more preferably of from 80-100, more preferably of from 85-100, and even more preferably of from 90-100. Furthermore or in addition thereto, and preferably in addition thereto, as regards the intensity of the second reflection comprised in the range of 8.58°-9.05° 2θ, it is preferred according to the present invention that the intensity of said reflection is comprised in the range of from 43-70, more preferably of from 46-60, more preferably of from 49-57, and even more preferably of from 51-55.

According to the present invention it is preferred that said zeolitic material having an MFI-type framework structure preferably contained in the inventive molding has an X-ray diffraction pattern comprising at least the following reflections:

| Intensity (%) | Diffraction angle 2θ/° [Cu K(alpha 1)] |
|---|---|
| 70-100 | 7.79-8.06 |
| 45-62 | 8.7-8.93 |
| 96-100 | 22.94-23.21 |
| 51-56 | 23.78-24.05 |
| 18-22 | 29.78-30.07 |
| 17-23 | 44.93-45.25 |
| 18-22 | 45.26-45.55 | wherein again 100% relates to the intensity of the maximum peak in the X-ray powder diffraction pattern.

As regards the intensity of the first reflection comprised in the range of 7.79°-8.06° 2θ, it is further preferred according to the present invention that the intensity of said reflection is comprised in the range of from 80-100, more preferably of from 85-100, and even more preferably of from 90-100. Furthermore or in addition thereto, and preferably in addition thereto, as regards the intensity of the second reflection comprised in the range of 8.7°-8.93° 2θ, it is preferred according to the present invention that the intensity of said reflection is comprised in the range of from 46-60, more preferably of from 49-57, and even more preferably of from 51-55.

As concerns the $^{29}$Si MAS NMR of the zeolitic material preferably contained in the inventive molding, there is no particular restriction as to the number and/or respective ppm values and/or relative intensities of the signals displayed in the NMR spectrum. According to the present invention, it is however preferred that the $^{29}$Si MAS NMR of the zeolitic material contained in the inventive molding comprises a first peak (P"1) which is comprised in the range of from −110.4 to −114.0 ppm in addition to a second peak (P"2) comprised in the range of from −100.2 to −104.2 ppm. More preferably, the $^{29}$Si MAS NMR of the zeolitic material contained in the inventive molding comprises a first peak (P"1) comprised in the range of from −110.8 to −113.4 ppm and a second peak (P"2) in the range of from −100.8 to −103.6 ppm. According to the present invention, it is particularly preferred that the $^{29}$Si MAS NMR of the zeolitic material contained in the inventive molding comprises a first peak (P"1) comprised in the range of from −111.2 to −112.8 ppm; and a second peak (P"2) comprised in the range of from −101.4 to −103.0 ppm.

According to the present invention, it is further preferred that the deconvoluted $^{29}$Si MAS NMR spectrum of the zeolitic material contained in the inventive molding comprises a further peak comprised in the range of from −113.2 to −115.2 ppm, wherein more preferably said additional peak is comprised in the range of from −113.5 to −114.9 ppm. According to the present invention, it is particularly preferred that the zeolitic material comprises a further peak in the deconvoluted $^{29}$Si MAS NMR spectrum comprised in the range of from −113.8 to −114.7 ppm. In principle, as regards the deconvoluted $^{29}$Si MAS NMR spectrum, any suitable method may be employed for deconvolution thereof provided that said method is able to identify a further peak in the $^{29}$Si MAS NMR spectrum of the zeolitic material preferably employed in the inventive molding. According to the present invention it is however preferred that the deconvolution is performed using DMFit (Massiot et al., *Magnetic Resonance in Chemistry*, 40 (2002) pp. 70-76). In particular, it is preferred that according to said method the fitting model is comprised of three Gaussian functions, with starting positions at −103 ppm, −112 ppm and −114 ppm. Furthermore, it is preferred that both peak position and line width are left unrestrained, with the consequence that the fit peaks are not fixed at a certain position.

There is no particular restriction according to the present invention as to the standard used in the $^{29}$Si MAS NMR experiments for obtaining the respective values for the chemical shift in ppm in the $^{29}$Si MAS NMR spectra according to particular and preferred embodiments of the present invention, wherein preferably an external standard is used. According to particularly preferred embodiments, the external standard used in the $^{29}$Si MAS NMR experiment is the polymer Q8M8 as an extenal secondary standard in the $^{29}$Si MAS NMR experiment, wherein the resonance of the trimethylsilyl M group is set to 12.5 ppm.

Furthermore, according to the present invention, it is particularly preferred that the $^{29}$Si MAS solid-state NMR values as well as $^{29}$Si CP-MAS solid-state NMR values as defined in any of the particular and preferred embodiments of the present invention refer to the values which are obtained for the zeolitic materials in question using a Bruker Avance spectrometer with 300 MHz $^1$H Larmor frequency (Bruker Biospin, Germany). More preferably, the values as defined are obtained from samples of the zeolitic material which are packed in 7 mm $ZrO_2$ rotors, and measured under 5 kHz Magic Angle Spinning at room temperature. $^{29}$Si spectra from cross-polarization (CP) and values obtained therefrom preferably refer values obtained using $^1$H ($\pi$/2)-pulse excitation followed by 5 ms $^1$H-$^{29}$Si Hartmann-Hahn matching with constant power radiofrequency pulses corresponding to 45 kHz for $^1$H and 50 kHz for $^{29}$Si nutation radiofrequency. Preferably, the $^{29}$Si carrier frequency is set to −62 or −64 ppm, and a scan recycle delay of 2 s is used. The signal is preferably acquired for 25 ms under 45 kHz high-power proton decoupling, and accumulated for 6 h. The spectra from which the values are preferably obtained are processed using Bruker Topspin with 30 Hz exponential line broadening, manual phasing, and manual baseline correction over the full spectrum width. As noted above, the spectra are preferably referenced with the polymer Q8M8 provided by Bruker as an external secondary standard, by setting the resonance of the trimethylsilyl M group to 12.5 ppm.

According to the present invention, it is preferred that at least a portion of the Y atoms and/or of the X atoms of the MFI-type framework structure of the zeolitic material preferably contained in the inventive molding is isomorphously substituted by one or more elements. In this respect, there is no particular restriction as to the one or more elements which may substitute Y atoms and/or X atoms of the MFI-type framework structure wherein preferably said elements are selected from the group consisting of B, Fe, Ti, Sn, Ga, Ge, Zr, V, Nb, Cu, Zn, Li, Be, and mixtures of two or more thereof, wherein even more preferably, the one or more elements are selected from the group consisting of B, Fe, Ti, Sn, Zr, Cu, and mixtures of two or more thereof. According to the present invention, it is particularly preferred that at least a portion of the Y atoms and/or of the X atoms in the MFI-type framework structure is isomorphously substituted by Ti and/or B, and preferably by Ti. According to the present invention, it is yet further preferred that the zeolitic material contained in the inventive molding is an isomorphously substituted zeolitic material according to any one of the aforementioned particular and preferred embodiments of the present invention, and particularly preferably that the zeolitic material contained in the inventive molding is a Ti-isomorphously substituted zeolitic material having the MFI-type framework structure, which even more preferably is TS-1.

As regards the amount of the one or more elements in the preferred zeolitic material which substitute at least a portion of the Y atoms and/or of the X atoms in the MFI-type framework structure, no particular restriction applies according to the present invention. Thus, by way of example, the molar ratio of $YO_2$ to the one or more elements isomorphously substituted in the MFI-type framework structure may range anywhere from 5 to 100, wherein the molar ratio is preferably comprised in the range of from 10 to 80, more preferably of from 20 to 70, more preferably of from 25 to 65, more preferably of from 30 to 50, and even more preferably of from 35 to 45. According to the present invention, it is particularly preferred that the molar ratio of $YO_2$ to the one or more elements isomorphously substituting Y atoms and/or X atoms in the MFI-type framework structure are comprised in the range of from 38 to 40.

According to the present invention, the preferred zeolitic material contained in the inventive material having an MFI-type framework structure may optionally comprise $X_2O_3$, wherein X is a trivalent element. With respect to such embodiments of the present invention wherein the zeolitic material further comprises $X_2O_3$, there is no particular restriction as to the amount thereof which may be contained in the MFI-type framework structure. Thus, by way of example, the $YO_2:X_2O_3$ molar ratio of the zeolitic material may be comprised anywhere in the range of from 2 to 200, wherein preferably the $YO_2:X_2O_3$ molar ratio is comprised in the rage of from 3 to 160, more preferably of from 5 to 140, more preferably of from 8 to 120, more preferably of from 10 to 100, and even more preferably of from 15 to 80. According to the present invention, it is particularly preferred that the $YO_2:X_2O_3$ molar ratio of the zeolitic material is comprised in the range of from 20 to 60. According to the present invention, it is however preferred that the MFI-type framework structure of the zeolitic material preferably contained in the inventive molding does not contain any substantial amount of $Al_2O_3$, and even more preferably does not contain any substantial amount of $X_2O_3$, wherein X stands for Al, B, In, Ga, and mixtures of two or more thereof. More specifically, according to the present invention it is particularly preferred that the MFI-type framework structure does not contain any substantial amounts of $X_2O_3$, wherein X is a trivalent element. Within the meaning of the present invention, the term "substantial" as employed with respect to the amount of $X_2O_3$ and in particular of $Al_2O_3$ which may be contained in the zeolitic material having an MFI-type framework structure which is preferably contained in the inventive molding, said term indicates an amount of 0.1 wt.-% or less of $X_2O_3$ based on 100 wt.-% of the zeolitic material, more preferably an amount of 0.05 wt.-% or less, more preferably of 0.001 wt.-% or less, more preferably of 0.0005 wt.-% ort less and even more preferably an amount of 0.0001 wt.-% or less thereof.

According to the present invention, the zeolitic material having an MFI-type framework structure preferably comprised in the inventive molding comprises YO2. In principle, Y stands for any conceivable tetravalent element, Y standing for either or several tetravalent elements. Preferred tetravalent elements according to the present invention include Si, Sn, Ti, Zr, and Ge, and combinations thereof. More preferably, Y stands for Si, Ti, or Zr, or any combination of said tetravalent elements, even more preferably for Si, and/or Sn. According to the present invention, it is particularly preferred that Y stands for Si.

As regards $X_2O_3$ optionally comprised in the MFI-framework structure of the zeolitic material preferably comprised in the inventive molding, X may in principle stand for any conceivable trivalent element, wherein X stands for one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al.

In addition to the framework elements of the zeolitic material of the present invention comprised in the inventive molding, said zeolitic material preferably further contains one or more types of non-framework elements which do not constitute the framework structure and are accordingly present in the pores and/or cavities formed by the framework structure and typical for zeolitic material in general. In this respect, there is no particular restriction as to the types of non-framework elements which may be contained in the zeolitic material, nor with respect to the amount in which they may be present therein. It is, however, preferred that the zeolitic material contained in the inventive molding comprises one or more cation and/or cationic elements as ionic non-framework elements, wherein again no particular restriction applies as to the type or number of different types of ionic non-framework elements which may be present in the zeolitic material, nor as to their respective amount. According to preferred embodiments of the present invention, the ionic non-framework elements preferably comprise one or more cations and/or cationic elements selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, wherein more preferably these are selected from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof. According to particularly preferred embodiments of the present invention, the ionic non-framework elements comprise one or more cations and/or cationic elements selected from the group consisting of Mg, Mo, Fe, Ni, Cu, Zn, Ag, and mixtures of two or more thereof.

According to the present invention, no particular restriction applies relative to further components which may be contained in the inventive molding in addition to the zeolitic material. Thus, in principle, any suitable further materials may be contained therein, wherein it is preferred according to the present invention that the inventive molding further comprises one or more binders in addition to the zeolitic material. As regards the type or number of binders which may be further contained in the inventive molding, again no particular restriction applies, such that by way of example the molding may further comprise one or more binders selected from the group of inorganic and organic binders, including mixtures of two or more thereof. According to the present invention, it is however preferred that the one or more binders comprise one or more inorganic binders, wherein preferably the one or more binders comprise one or more sources of a metal oxide and/or of a metalloid oxide, and more preferably one or more sources of a metal oxide and/or of a metalloid oxide selected from the group consisting of silica, alumina, titania, zirconia, lanthana, magnesia, and mixtures and/or mixed oxides of two or more thereof, more preferably from the group consisting of silica, alumina, titania, zirconia, magnesia, silica-alumina mixed oxides, silica-titania mixed oxides, silica-zirconia mixed oxides, silica-lanthana mixed oxides, silica-zirconia-lanthana mixed oxides, alumina-titania mixed oxides, alumina-zirconia mixed oxides alumina-lanthana mixed oxides, alumina-zirconia-lanthana mixed oxides, titania-zirconia mixed oxides, and mixtures and/or mixed oxides of two or more thereof, more preferably from the group consisting of silica, alumina, silica-alumina mixed oxides and mixtures of two or more thereof, wherein more preferably the one or more binders comprise one or more sources of silica. According to the present invention it is particularly preferred that the binder consists of one or more sources of silica, wherein the one or more sources of silica preferably comprise one or more compounds selected from the group consisting of fumed silica, colloidal silica, silica-alumina, colloidal silica-alumina, and mixtures of two or more thereof, more preferably one or more compounds selected from the group consisting of fumed silica, colloidal silica, and mixtures thereof. According to the present invention it is yet further preferred that the one or more binders consists of fumed silica and/or colloidal silica, and even more preferably that the one or more binders either consist of fumed silica or of colloidal silica.

There is no particular restriction according to the present invention as to the suitable physical and/or chemical characteristics of the zeolitic material contained in the inventive molding, provided that it displays a water adsorption ranging from 1 to 15 wt.-% when exposed to a relative humidity of 85%. Thus, as regards for example the porosity and/or surface area of the zeolitic material, these may in principle adopt any suitable values. Thus, as regards the BET surface area of the zeolitic material as determined according to DIN 66135, it may accordingly range anywhere from 50 to 700 $m^2/g$, wherein preferably the surface area of the inventive zeolitic material is comprised in the range of from 100 to 650 $m^2/g$, more preferably from 200 to 600 $m^2/g$, more preferably from 300 to 550 $m^2/g$, more preferably from 350 to 500 $m^2/g$, and even more preferably from 390 to 470 $m^2/g$. According to the present invention, it is particularly preferred that the BET surface area of the zeolitic material contained in the inventive molding as determined according to DIN 66135 ranges from 420 to 440 $m^2/g$.

As regards the specific surface area of the inventive molding, no particular restrictions apply such that, by way of example, the surface may range anywhere from 50 to 700 $m^2/g$, wherein preferably the surface area of the molding is comprised in the range of from 100 to 500 $m^2/g$, wherein more preferably the surface area ranges from 150 to 475 $m^2/g$, more preferably from 200 to 450 $m^2/g$, more preferably from 250 to 425 $m^2/g$, and more preferably from 300 to 400 $m^2/g$. According to the present invention, it is particularly preferred that the molding displays a specific surface area ranging from 325 to 375 $m^2/g$. As employed in the present application, the term "specific surface area" preferably refers to the specific surface area of the materials described when determined according to DIN 66131.

As regards the pore volume which the inventive molding may display, again no particular restriction applies according to the present invention, such that the pore volume of the molding may range anywhere from 0.1 to 2.5 ml/g, wherein preferably the pore volume is comprised in the range of from 0.3 to 2 ml/g, more preferably from 0.5 to 1.7 ml/g, more preferably from 0.7 to 1.5 ml/g, and more preferably from 0.9 to 1.3 ml/g. According to the present invention, it is particularly preferred that the molding displays a pore volume comprised in the range of from 0.9 to 1.1 ml/g. As used in the present application, the term "pore volume" preferably refers to the pore volume of the materials determined according to DIN 66133.

With respect to the mechanical strength of the inventive moldings, it is preferred that these display values which allow for their use in a variety of possible applications and in particular in applications requiring an elevated value relative to the hardness and therefore to the abrasion resistance of the moldings. For this reason, it is preferred according to the present invention that the molding displays a mechanical strength comprised in the range of from 1 to 15 N, wherein more preferably, the mechanical strength of the inventive molding is comprised in the range of from 1 to 12 N, more preferably from 2 to 9 N, more preferably from 2 to 7 N, more preferably from 3 to 6 N, and more preferably from 3 to 5 N. According to the present invention, it is particularly preferred that the molding displays a mechanical strength comprised in the range of from 3 to 4 N. Within the meaning of the present invention, the term "mechanical strength" preferably refers to the values determined for a given molding according to the procedure described in the experimental section of the present application.

Besides the aforementioned preferred characteristics of the inventive molding relative to its porous structure, the inventive moldings are also characterized by a specific tortuosity reflecting the diffusion characteristics of fluids through the porous structure of the molding. Again, no particular restriction applies according to the present invention relative to the tortuosity which may be displayed by the inventive moldings. It is, however, preferred according to the present invention that the tortuosity of the inventive moldings relative to water is comprised in the range of from 0.3 to 5.0±0.2, and more preferably from 0.5 to 4.5±0.2, more preferably from 0.7 to 4.0±0.2, more preferably from 0.9 to 3.5±0.2, more preferably from 1.1 to 2.5±0.2, more preferably from 1.3 to 2.2±0.2, and more preferably of from 1.4 to 2.1±0.2. According to the present invention, it is particularly preferred that the moldings display a tortuosity relative to water comprised in the range of from 1.5 to 2.0±0.2. Within the meaning of the present invention, the term "tortuosity" refers to the tortuosity characteristic of the inventive materials at a temperature of 298.15 K and preferably as defined in US 2007/0099299 A1, and more preferably as defined in the experimental section of the present application.

According to the present invention, it is further preferred that the inventive molding display a tortuosity relative to cylcooctane comprised in the range of from 0.3 to 3.5±0.1, and more preferably of from 0.5 to 3±0.1, more preferably of from 0.8 to 2.5±0.1, more preferably of from 1 to 2.2±0.1, more preferably of from 1.2 to 2.0±0.1, more preferably of from 1.3 to 1.9±0.1, more preferably of from 1.4 to 1.8±0.1, and more preferably of from 1.4 to 1.6±0.1. As for the tortuosity of the inventive molding relative to water, the tortuosity of the inventive molding relative to cyclooctane refers to the tortuosity characteristic of the inventive materials at a temperature of 298.15 K and preferably as defined in US 2007/0099299 A1, and more preferably as defined in the experimental section of the present application.

In general, the inventive moldings described above can be used in any suitable application such as by way of example as a molecular sieve, adsorbent, catalyst, or catalyst support. For example, the inventive molding according to any of the particular and preferred embodiments of the present invention can be used as molecular sieve to dry gases or liquids, for selective molecular separation, e.g. for the separation of hydrocarbons or amines; as ion exchanger; as chemical carrier; as adsorbent, in particular as adsorbent for the separation of hydrocarbons or amines; or as a catalyst. Most preferably, the inventive molding is used as a catalyst and/or as a catalyst support.

According to a preferred embodiment of the present invention, the inventive molding is used in a catalytic process, and preferably as a catalyst and/or catalyst support, and more preferably as a catalyst. In general, the inventive molding can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond.

Furthermore, it is preferred according to the present invention that inventive molding is used as a molecular trap for organic compounds. In general, any type of organic compound may be trapped in the zeolitic materials, wherein it is preferred that the compound is reversibly trapped, such that it may be later released from the inventive molding, preferably wherein the organic compound is released—preferably without conversion thereof—by an increase in temperature and/or a decrease in pressure. Furthermore, it is preferred that the inventive molding is used to trap organic compounds of which the dimensions allow them to penetrate the microporous system of the molecular structure of the zeolitic material contained in the inventive molding. According to yet further embodiments of the present invention, it is preferred that the trapped compounds are released under at least partial conversion thereof to a chemical derivative and/or to a decomposition product thereof, and preferably to a thermal decomposition product thereof.

As regards the applications in which the inventive molding may be employed, it may be used in any conceivable way, wherein it is preferably used as a molecular sieve, as an adsorbent, for ion-exchange, as a catalyst and/or as a catalyst support. With respect to specific catalytic applications in which the inventive molding may be employed, again no particular restriction applies provided that a catalytic effect may be achieved and/or enhanced, wherein the inventive moldIngs are preferably used as a catalyst in a reaction involving C—C bond formation and/or conversion, and preferably as a catalyst and/or catalyst support in an isomerization reaction, in an ammoxidation reaction, in a hydrocracking reaction, in an alkylation reaction, in an acylation reaction, in a reaction for the conversion of alkanes to olefins, in a reaction for the conversion of one or more oxygenates to olefins and/or aromatics, or in an epoxidation reaction, preferably as a catalyst and/or catalyst support in a reaction for the epoxidation of olefins, more preferably in a reaction for the epoxidation of C2-C5 alkenes, more preferably in a reaction for the epoxidation of C2-C4 alkenes, in a reaction for the epoxidation of C2 or C3 alkenes, and more preferably for the epoxidation of C3 alkenes. According to the present invention it is particularly preferred that the inventive molding is employed as a catalyst for the conversion of propylene to propylene oxide.

The present invention includes the following embodiments, wherein these include the specific combinations of embodiments as indicated by the respective interdependencies defined therein:

1. A process for the production of a molding, comprising
   (I) providing a zeolitic material;
   (II) mixing the zeolitic material provided in step (I) with one or more binders;

(III) kneading of the mixture obtained in step (II);
(IV) molding of the kneaded mixture obtained in step (III) to obtain one or more moldings;
(V) drying of the one or more moldings obtained in step (IV); and
(VI) calcining of the dried molding obtained in step (V);
wherein the zeolitic material provided in step (I) displays a water adsorption ranging from 1 to 15 wt.-% when exposed to a relative humidity of 85%, wherein preferably the water adsorption ranges from 2 to 14 wt.-%, more preferably from 2.5 to 11 wt.-%, more preferably from 3 to 10 wt.-%, more preferably from 4 to 9 wt.-%, more preferably from 5 to 8.7 wt.-%, more preferably from 7 to 8.4 wt.-%, and more preferably from 7.5 to 8.2 wt.-%.

2. The process of embodiment 1, wherein the one or more binders are selected from the group consisting of inorganic binders, wherein the one or more binders preferably comprise one or more sources of a metal oxide and/or of a metalloid oxide, more preferably one or more sources of a metal oxide and/or of a metalloid oxide selected from the group consisting of silica, alumina, titania, zirconia, lanthana, magnesia, and mixtures and/or mixed oxides of two or more thereof, more preferably from the group consisting of silica, alumina, titania, zirconia, magnesia, silica-alumina mixed oxides, silica-titania mixed oxides, silica-zirconia mixed oxides, silica-lanthana mixed oxides, silica-zirconia-lanthana mixed oxides, alumina-titania mixed oxides, alumina-zirconia mixed oxides, alumina-lanthana mixed oxides, alumina-zirconia-lanthana mixed oxides, titania-zirconia mixed oxides, and mixtures and/or mixed oxides of two or more thereof, more preferably from the group consisting of silica, alumina, silica-alumina mixed oxides, and mixtures of two or more thereof, wherein more preferably the one or more binders comprise one or more sources of silica, wherein more preferably the binder consists of one or more sources of silica, wherein the one or more sources of silica preferably comprise one or more compounds selected from the group consisting of fumed silica, colloidal silica, silica-alumina, colloidal silica-alumina, and mixtures of two or more thereof, more preferably one or more compounds selected from the group consisting of fumed silica, colloidal silica, and mixtures thereof, wherein more preferably the one or more binders consists of fumed silica and/or colloidal silica, and more preferably of fumed silica or colloidal silica.

3. The process of embodiment 1 or 2, wherein the mixture obtained in step (II) displays a weight ratio of the one or more binders to the zeolitic material (binder:zeolitic material) ranging from 0.1 to 0.6, more preferably from 0.15 to 0.5, and more preferably from 0.2 to 0.45.

4. The process of any of embodiments 1 to 3, wherein step (II) further comprises mixing the zeolitic material and the one or more binders with a solvent system, wherein the solvent system comprises one or more solvents, wherein preferably the solvent system comprises one or more hydrophilic solvents, the hydrophilic solvents preferably being selected from the group consisting of polar solvents, more preferably from the group consisting of polar protic solvents, wherein more preferably the solvent system comprises one or more polar protic solvents selected from the group consisting of water, alcohols, carboxylic acids, and mixtures of two or more thereof, more preferably from the group consisting of water, C1-C5 alcohols, C1-C5 carboxylic acids, and mixtures of two or more thereof, more preferably from the group consisting of water, C1-C4 alcohols, C1-C4 carboxylic acids, and mixtures of two or more thereof, more preferably from the group consisting of water, C1-C3 alcohols, C1-C3 carboxylic acids, and mixtures of two or more thereof, more preferably from the group consisting of water, methanol, ethanol, propanol, formic acid, acetic acid, and mixtures of two or more thereof, more preferably from the group consisting of water, ethanol, acetic acid, and mixtures of two or more thereof, wherein more preferably the solvent system comprises water and/or ethanol, and wherein more preferably the solvent system comprises water, wherein even more preferably the solvent system consists of water.

5. The process of embodiment 4, wherein the mixture obtained in step (II) displays a weight ratio of the solvent system to the zeolitic material (solvent system:zeolitic material) ranging from 0.7 to 1.7, more preferably from 0.8 to 1.6, more preferably from 0.9 to 1.5, and more preferably from 1.0 to 1.4.

6. The process of any of embodiments 1 to 5, wherein step (II) further comprises mixing the zeolitic material and the one or more binders with one or more pore forming agents, wherein the one or more pore forming agents are preferably selected from the group consisting of polymers, carbohydrates, graphite, and mixtures of two or more thereof, more preferably from the group consisting of polymeric vinyl compounds, polyalkylene oxides, polyacrylates, polyolefins, polyamides, polyesters, cellulose and cellulose derivatives, sugars, and mixtures of two or more thereof, more preferably from the group consisting of polystyrene, C2-C3 polyalkylene oxides, cellulose derivatives, sugars, and mixtures of two or more thereof, more preferably from the group consisting of polystyrene, polyethylene oxide, C1-C2 hydroxyalkylated and/or C1-C2 alkylated cellulose derivatives, sugars, and mixtures of two or more thereof, more preferably from the group consisting of polystyrene, polyethylene oxide, hydroxyethyl methyl cellulose, and mixtures of two or more thereof, wherein more preferably the one or more pore forming agents consists of one or more selected from the group consisting of polystyrene, polyethylene oxide, hydroxyethyl methyl cellulose, and mixtures of two or more thereof, and more preferably wherein the one or more pore forming agents consist of a mixture of polystyrene, polyethylene oxide, and hydroxyethyl methyl cellulose.

7. The process of embodiment 6, wherein the mixture obtained in step (II) displays a weight ratio of the one or more pore forming agents to the zeolitic material (pore forming agent:zeolitic material) ranging from 0.1 to 0.7, more preferably from 0.15 to 0.6, more preferably from 0.2 to 0.5, more preferably from 0.25 to 0.45, and more preferably from 0.3 to 0.4.

8. The process of embodiment 6, wherein the mixture obtained in step (II) displays a weight ratio of the solvent system to the one or more binders and pore forming agents to the zeolitic material (solvent system:binder and pore forming agent:zeolitic material) ranging from (0.7-1.7):(0.4-1):1, preferably from (0.8-1.6):(0.5-0.9):1, more preferably from (0.9-1.5):(0.55-0.85):1, more preferably from (1.0-1.4):(0.6-0.8):1, and more preferably from (1.1-1.3):(0.65-0.75):1.

9. The process of any of embodiments 1 to 8, wherein the calcining of the dried molding obtained in step (V) is performed at a temperature ranging from 350 to 850° C., preferably from 400 to 700° C., more preferably from 450 to 650° C., and more preferably from 475 to 600° C.

10. The process of any of embodiments 1 to 9, further comprising
    (VII) subjecting the calcined molding obtained in step (VI) to a hydrothermal treatment; wherein preferably the hydrothermal treatment is conducted under autogenous pressure, wherein more preferably the hydrothermal treatment is conducted at a temperature ranging from 80 to 200° C., preferably from 90 to 180° C., more preferably from 100 to 170° C., more preferably from 110 to 160° C., and more preferably from 120 to 150° C.
11. The process of embodiment 10, wherein the hydrothermal treatment is performed with a water containing solvent system and/or with an aqueous solution, wherein preferably the hydrothermal treatment is performed with distilled water.
12. The process of embodiment 10 or 11, wherein the hydrothermal treatment is performed for a duration ranging from 1 to 48 hours, preferably from 2 to 36 hours, more preferably from 4 to 24 hours, more preferably from 5 to 12 hours, more preferably from 2 to 9 hours.
13. The process of any of embodiments 1 to 12, wherein the zeolitic material provided in step (I) comprises one or more zeolites, wherein the one or more zeolites preferably have a framework structure selected among the group consisting of AEI, BEA, CHA, CDO, DDR, EMT, ERI, EUO, FAU, FER, HEU, LEV, MAZ, MEI, MEL, MFI, MFS, MOR, MOZ, MRE, MTN, MTT, MTW, MWW, NON, OFF, RRO, TON, and combinations of two or more thereof, more preferably from the group consisting of BEA, CHA, CDO, FAU, FER, HEU, LEV, MEL, MFI, MOR, MWW, RRO, and combinations of two or more thereof, more preferably from the group consisting of BEA, CHA, FAU, FER, LEV, MEL, MFI, MWW, and combinations of two or more thereof, more preferably from the group consisting of, MEL, MFI, MWW, and combinations of two or more thereof, wherein more preferably the one or more zeolites have the MFI-type framework structure, wherein the zeolitic material preferably comprises one or more zeolites of the MFI-type framework structure selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof, wherein more preferably the zeolitic material comprises Silicalite and/or TS-1, wherein more preferably the zeolitic material consists of TS-1.
14. A molding, obtainable by a process according to any of embodiments 1 to 13.
15. A molding, preferably obtainable and/or obtained by a process according to any of embodinvents 1 to 13, wherein said molding contains a zeolitic material displaying a water adsorption ranging from 1 to 15 wt.-% when exposed to a relative humidity of 85%, wherein preferably the water adsorption ranges from 2 to 14 wt.-%, more preferably from 2.5 to 11 wt.-%, more preferably from 3 to 10 wt.-%, more preferably from 4 to 9 wt.-%, more preferably from 5 to 8.7 wt.-%, more preferably from 7 to 8.4 wt.-%, and more preferably from 7.5 to 8.2 wt.-%.
16. The molding of embodiment 15, wherein the zeolitic material comprises one or more zeolites, wherein the one or more zeolites preferably have a framework structure selected among the group consisting of AEI, BEA, CHA, CDO, DDR, EMT, ERI, EUO, FAU, FER, HEU, LEV, MAZ, MEI, MEL, MFI, MFS, MOR, MOZ, MRE, MTN, MTT, MTW, MWW, NON, OFF, RRO, TON, and combinations of two or more thereof, more preferably from the group consisting of BEA, CHA, CDO, FAU, FER, HEU, LEV, MEL, MFI, MOR, MWW, RRO, and combinations of two or more thereof, more preferably from the group consisting of BEA, CHA, FAU, FER, LEV, MEL, MFI, MWW, and combinations of two or more thereof, more preferably from the group consisting of, MEL, MFI, MWW, and combinations of two or more thereof, wherein more preferably the one or more zeolites have the MFI-type framework structure, wherein the zeolitic material preferably comprises one or more zeolites of the MFI-type framework structure selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, and mixtures of two or more thereof, wherein more preferably the zeolitic material comprises Silicalite and/or TS-1, wherein more preferably the zeolitic material consists of TS-1.
17. The molding of embodiment 15, wherein the zeolitic material has an MFI-type framework structure comprising $YO_2$ and optionally comprising $X_2O_3$,
    wherein Y is a tetravalent element, and X is a trivalent element,
    said material having an X-ray diffraction pattern comprising at least the following reflections:

| Intensity (%) | Diffraction angle 2θ/° [Cu K(alpha 1)] |
|---|---|
| 55-100 | 7.66-8.20 |
| 40-75 | 8.58-9.05 |
| 92-100 | 22.81-23.34 |
| 49-58 | 23.64-24.18 |
| 16-24 | 29.64-30.21 |
| 14-25 | 44.80-45.25 |
| 16-24 | 45.26-45.67 | wherein 100% relates to the intensity of the maximum peak in the X-ray powder diffraction pattern.
18. The molding of embodiment 17, wherein the $^{29}$Si MAS NMR of the zeolitic material comprises:
    a first peak (P"1) in the range of from −110.4 to −114.0 ppm, preferably of from −110.8 to −113.4 ppm, and even more preferably of from −111.2 to −112.8 ppm; and
    a second peak (P"2) in the range of from −100.2 to −104.2 ppm, preferably of from −100.8 to −103.6 ppm, and even more preferably of from −101.4 to −103.0 ppm.
19. The molding of embodiment 18, wherein the deconvoluted $^{29}$Si MAS NMR spectrum comprises one additional peak comprised in the range of from −113.2 to −115.2 ppm, more preferably of from −113.5 to −114.9 ppm, and even more preferably of from −113.8 to −114.7 ppm.
20. The molding of any of embodiments 17 to 19, wherein at least a portion of the Y atoms and/or of the X atoms in the MFI-type framework structure is isomorphously substituted by one or more elements, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Ti and/or B, preferably Ti.
21. The molding of any of embodiments 17 to 20, wherein the molar ratio of $YO_2$ to the one or more element ranges from 5 to 100, preferably from 10 to 80, more preferably from 20 to 70, more preferably from 25 to 65, more preferably from 30 to 60, more preferably from 35 to 55, and even more preferably from 40 to 50.
22. The molding of any of embodiments 17 to 21, wherein the MFI-type framework structure of the zeolitic material does not contain $X_2O_3$.
23. The molding of any of embodiments 17 to 22, wherein Y is selected from the group consisting of Si, Sn, Ti, Zr, Ge, and mixtures of two or more thereof, Y preferably being Si.
24. The molding of any of embodiments 15 to 23, wherein the zeolitic material comprises one or more cation and/or cationic elements as ionic non-framework elements, said one or more cation and/or cationic elements preferably comprising one or more selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof, and even more preferably from the group consisting of Mg, Mo, Fe, Ni, Cu, Zn, Ag, and mixtures of two or more thereof.
25. The molding of any of embodiments 15 to 24, wherein the molding further comprises one or more binders, wherein the one or more binders are preferably selected from the group consisting of inorganic binders, wherein the one or more binders preferably comprise one or more sources of a metal oxide and/or of a metalloid oxide, more preferably one or more sources of a metal oxide and/or of a metalloid oxide selected from the group consisting of silica, alumina, titania, zirconia, lanthana, magnesia, and mixtures and/or mixed oxides of two or more thereof, more preferably from the group consisting of silica, alumina, titania, zirconia, magnesia, silica-alumina mixed oxides, silica-titania mixed oxides, silica-zirconia mixed oxides, silica-lanthana mixed oxides, silica-zirconia-lanthana mixed oxides, alumina-titania mixed oxides, alumina-zirconia mixed oxides alumina-lanthana mixed oxides, alumina-zirconia-lanthana mixed oxides, titania-zirconia mixed oxides, and mixtures and/or mixed oxides of two or more thereof, more preferably from the group consisting of silica, alumina, silica-alumina mixed oxides and mixtures of two or more thereof, wherein more preferably the one or more binders comprise one or more sources of silica, wherein more preferably the binder consists of one or more sources of silica, wherein the one or more sources of silica preferably comprise one or more compounds selected from the group consisting of fumed silica, colloidal silica, silica-alumina, colloidal silica-alumina, and mixtures of two or more thereof, more preferably one or more compounds selected from the group consisting of fumed silica, colloidal silica, and mixtures thereof, wherein more preferably the one or more binders consists of fumed silica and/or colloidal silica, and more preferably of fumed silica or colloidal silica.
26. The molding of any of embodiments 15 to 25, wherein the BET surface area of the zeolitic material contained in the molding determined according to DIN 66131 ranges from 50 to 700 $m^2/g$, preferably from 100 to 650 $m^2/g$, more preferably from 200 to 600 $m^2/g$, more preferably from 300 to 550 $m^2/g$, more preferably from 350 to 500 $m^2/g$, more preferably from 390 to 470 $m^2/g$, more preferably from 420 to 440 $m^2/g$.
27. The molding of any of embodiments 15 to 26, wherein the specific surface area of the molding determined according to DIN 66131 ranges from 50 to 700 $m^2/g$, preferably from 100 to 500 $m^2/g$, more preferably from 150 to 475 $m^2/g$, more preferably from 200 to 450 $m^2/g$, more preferably from 250 to 425 $m^2/g$, more preferably from 300 to 400 $m^2/g$, and more preferably from 325 to 375 $m^2/g$.
28. The molding of any of embodiments 15 to 27, wherein the pore volume of the molding determined according to DIN 66133 ranges from 0.1 to 2.5 ml/g, preferably from 0.3 to 2 ml/g, more preferably from 0.5 to 1.7 ml/g, more preferably from 0.7 to 1.5 ml/g, more preferably from 0.9 to 1.3 ml/g, and more preferably from 0.9 to 1.1 ml/g.
29. The molding of any of embodiments 15 to 28, having a mechanical strength of from 1 to 15 N, preferably from 1 to 12 N, more preferably from 2 to 9 N, more preferably from 2 to 7 N, more preferably from 3 to 6 N, more preferably from 3 to 5 N, and more preferably from 3 to 4 N.
30. The molding of any of embodiment 15 to 29, wherein the molding has a tortuosity relative to water ranging from 0.3 to 5.0±0.2, preferably from 0.5 to 4.5±0.2, more preferably from 0.7 to 4.0±0.2, more preferably from 0.9 to 3.5±0.2, more preferably from 1.1 to 2.5±0.2, more preferably from 1.3 to 2.2±0.2, more preferably from 1.4 to 2.1±0.2, and more preferably from 1.5 to 2.0±0.2.
31. Use of a molding according to any of embodiments 15 to 34 as a catalyst, catalyst support, adsorbent, or for ion exchange, wherein preferably the molding is used as a catalyst and/or catalyst support, more preferably as a catalyst and/or catalyst support in a reaction involving C—C bond formation and/or conversion, and preferably as a catalyst and/or catalyst support in an isomerization reaction, in an ammoxidation reaction, in a hydrocracking reaction, in an alkylation reaction, in an acylation reaction, in a reaction for the conversion of alkanes to olefins, or in a reaction for the conversion of one or more oxygenates to olefins and/or aromatics, or in an epoxidation reaction, preferably as a catalyst and/or catalyst support in a reaction for the epoxidation of olefins, more preferably in a reaction for the epoxidation of C2-C5 alkenes, more preferably in a reaction for the epoxidation of C2-C4 alkenes, in a reaction for the epoxidation of C2 or C3 alkenes, more preferably for the epoxidation of C3 alkenes, and more preferably as a catalyst for the conversion of propylene to propylene oxide.

EXPERIMENTAL SECTION

Water Adsorption/Desorption Isotherms

Calculation of the water adsorption properties of the examples of the experimental section was performed on a VTI SA instrument from TA Instruments following a step-isotherm program. The experiment consisted of a run or a series of runs performed on a sample material that has been placed on the microbalance pan inside of the instrument. Before the measurement were started, the residual moisture of the sample was removed by heating the sample to 100° C. (heating ramp of 5° C./min) and holding it for 6 h under a $N_2$ flow. After the drying program, the temperature in the cell was decreased to 25° C. and kept isothermal during the measurements. The microbalance was calibrated, and the weight of the dried sample was balanced (maximum mass deviation 0.01 wt. %). Water uptake by the sample was measured as the increase in weight over that of the dry sample. First, an adsorption curve was measured by increasing the relative humidity (RH) (expressed as weight-% water in the atmosphere inside of the cell) to which the samples was exposed and measuring the water uptake by the sample at equilibrium. The RH was increased with a step of 10 wt. % from 5 to 85% and at each step the system controlled the RH and monitored the sample weight until reaching the equilibrium conditions and recording the weight uptake. The total adsorbed water amount by the sample was taken after the sample was exposed to the 85 weight-% RH. During the desorption measurement the RH was decreased from 85 wt. % to 5 wt. % with a step of 10% and the change in the weight of the samples (water uptake) was monitored and recorded.

Determination of the Mechanical Strength

The moldings were tested with a device from the company Zwick, having a fixed turntable and a free-moving vertical plunger, which pushes the extrudate against the fixed turntable (lowering speed 10 mm/min). The free-moving plunger (10 mm contact width at right angle to the extrudate) is connected to a pressure transducer in order to register the force. The device is controlled by a computer, which records the single values and calculates the overall result.

The moldings with a diameter of 1.5 mm were stressed by a plunger (3 mm diameter) with increasing force, until a break of the extrudates occurs. The necessary force for breaking is denoted as the breaking resistance.

25 extrudates were taken from a representative sample and were examined with respect to completeness and intactness. Extrudates used had a minimum length of 3 mm. Only straight extrudates without defects were used.

Denotation of results: x̄±s
x̄=average breaking resistance in N
s=standard deviation in N Reference Examples 1 to 4

For the synthesis of the TS-1 zeolite samples using the allyl-tripropylammonium template, the following procedure was used: tetraethylorthosilicate (TEOS) (500 g) was added together with tetraethylortotitanat (TEOTi) (15 g) to a round bottom flask. 5200 g of a 20 wt. % of allyl-tripropylammonium hydroxide (ATPAOH) was then added under stirring to the flask containing the Si and Ti source. A yellow blurry solution is obtained after mixing all the components. The mixture was further kept under stirring for 1 h until the hydrolysis of the silica and titanium sources was finished and the temperature of the mixture was held constant at 54° C. The ethanol resulting from the hydrolysis of TEOS and TEOTi was separated by distillation from the synthesis mixture at 95° C. for 2 h, during which the solution was continuously stirred with 100 rpm.

After the distillation, 600 g of distilled water were added to (about 530 g) of the distillate and the solution was stirred for another hour at room temperature. Finally, the suspension was transferred to a 2.5 L stainless steel autoclave equipped with mechanical stirring. The autoclave was heated to 175° C. and kept for 16 h under continuous stirring (200 rpm).

After 16 h the autoclave was cooled to room temperature and distilled water was added to the suspension in a volumetric ratio of 1:1 (pH of the resulting solution was about 12). The suspension was then filtered on a Büchner filter and the solid was washed several times with water. The white solid was dried for 4 h at 120° C. and calcined for 5 h at 490° C. under air, using the following calcination program: 60 min to 120° C., 240 min at 120° C., 370 min from 120 to 490° C. and 300 min at 490° C.

The procedure was conducted four times using three different types of allyl-tripropylammonium hydroxide solutions displaying N-(2-propen-1-yl)-tri-n-propylammonium: N-(1-propen-1-yl)-tri-n-propylammonium molar ratios of 95:5, 92:8, and 89.4:10.6, respectively. The results of the synthesis of reference examples 1 to 4 employing this method are displayed in Table 1, including the characterization of the samples by elemental analysis (for Ti and Si), the BET surface area determined according to DIN 66131, and the water adsorption properties.

Reference Example 5

Starting materials: 8889 kg tetraethoxy silane (TEOS) (Wacker, TES-28)
  7300 kg ATPAOH (isomer ratio allyl:propenyl=88:12) (40 wt.-% in water, Sachen, USA)
  254 kg tetraethoxy titanate (TEOT) (Du Pont, Tyzor ET)
  16000 kg water TEOS (4000 kg) were loaded into a stirred tank reactor at room temperature and stirring (750 r.p.m.) was started. 254 kg TEOT were filled in the reactor under stirring and then 4889 kg of TEOS were added. Then, 7300 kg ATPAOH were added. Stirring was continued for 60 min. Ethanol released by hydrolysis was separated by distillation at a bottoms temperature of 86° C. 16000 kg distilled water were then added to the content of the first vessel, and water in an amount equivalent to the amount of distillate was further added. The obtained mixture was stirred for 1 h. Crystallization was performed at 175° C. within 5 h at autogenous pressure. The obtained titanium silicalite-1 crystals were separated, dried, and calcined in a rotary furnace at a temperature of 550° C. in air using a residence time of 2 h. The characterization of the sample obtained from reference example 5 by elemental analysis (for Ti and Si), the BET surface area determined according to DIN 66131, and the water adsorption capacity.

Comparative Example 1

As a comparative example, the corresponding characteristics of a TS-1 zeolite as obtained from synthesis with the tetrapropylammonium template as for example described in DE 19939416 A1 are shown in Table 1. In particular, it may be noted that the water adsorption capacity of the standard TS-1 zeolite is higher than for the TS-1 zeolites obtained using ATPAOH in reference examples 1 to 4, respectively.

TABLE 1

Characteristics of TS-1 samples prepared in reference examples 1 to 5 and Comparative Example 1

| Sample | isomer ratio[1] of organotemplate [mol %:mol %] | Ti [wt.-%] | Si [wt.-%] | BET [m$^2$/g] | H$_2$O ads. [wt.-%] |
|---|---|---|---|---|---|
| Ref. Ex. 1 | 95:5 | 1.9 | 43 | 429 | 2.9 |
| Ref. Ex. 2 | 92:8 | 2.0 | 45 | 428 | 7.6 |
| Ref. Ex. 3 | 92:8 | 2.0 | 45 | 436 | 7.6 |
| Ref. Ex. 4 | 89.4:10.6 | 1.9 | 45 | 442 | 8.0 |
| Comp. Ex. 1 | — | 1.9 | 43 | 471 | 10.2 |

[1]N-(2-propen-1-yl)-tri-n-propylammonium:N-(1-propen-1-yl)-tri-n-propylammonium

Example 1

100 g of TS-1 from Reference Example 5 were kneaded with 3.8 g of Methylcellulose (Walocel®) for 5 min, after which 99.5 g of a polystyrene dispersion (33.5 wt.-% in water) were continuously added under further kneading of the mixture. After 10 min, 82.5 g of Ludox® AS 40 (40 wt.-% silica in water) were added in a continuous manner while further kneading, after which the resulting mixture was further mixed for 10 min, after which 1.3 g of polyethylene oxide were then added. After further kneading for 25 min, 30 ml of distilled water were then added. The mixture was then extruded under a pressure of 70-80 bar into strands with a diameter of 1.9 mm, which were then dried for 4 hours at 120° C. and finally calcined at 500° C. for 5 hours to afford 122.5 g of extruded strands.

Example 2

100 g of TS-1 from Reference Example 4, 4 g of Methylcellulose (Walocel®), and 9.3 g of Aerosil® 200 were mixed together and kneaded for 5 min, after which 100.7 g of a polystyrene dispersion (33.1 wt.-% in water; average particle size 47.3 nm; pH=9.3) were continuously added under further kneading of the mixture. After 10 min, 1.33 g of polyethylene oxide were then added. After a further 10 min, 70 g of Ludox® AS 40 (40 wt.-% silica in water) were added in a continuous manner. After further kneading, 25 g of distilled water were then added, wherein 15 ml were added after 10 min and after a further 5 min the remaining 10 ml were then added, such that the total duration of kneading was 45 min. The mixture was then extruded under a pressure of 100 bar into strands with a diameter of 1.9 mm, which were then dried for 4 hours at 120° C. and finally calcined at 490° C. for 5 hours using the following calcination program: 60 min to 120° C., 240 min at 120° C., 370 min from 120 to 490° C. and 300 min at 490° C., to afford 122.7 g of extruded strands.

Example 3

105.3 g of TS-1 from Reference Example 5 and 4 g of Methylcellulose (Walocel®) were mixed together and kneaded for 5 min, after which 100.7 g of a polystyrene dispersion (33.1 wt.-% in water; average particle size 47.3 nm; pH=9.3) were continuously added under further kneading of the mixture. After 10 min, 1.33 g of polyethylene oxide were then added. After a further 10 min, 70 g of Ludox® AS 40 (40 wt.-% silica in water) were added in a continuous manner. After further kneading, 40 g of distilled water were then added, wherein 10 ml were added after 10 min, 10 ml after a further 5 min, 10 ml after a further 5 min, and finally 10 ml after a further 5 min, such that the total duration of kneading was 55 min. The mixture was then extruded under a pressure of 120 bar into strands with a diameter of 1.9 mm, which were then dried for 4 hours at 120° C. and finally calcined at 490° C. for 5 hours using the following calcination program: 60 min to 120° C., 240 min at 120° C., 370 min from 120 to 490° C. and 300 min at 490° C., to afford extruded strands.

Example 4

158 g of TS-1 from Reference Example 5, 6 g of Methylcellulose (Walocel®), and 50 g of dry polystyrene powder were mixed together and kneaded for 10 min, after which 105 g of Ludox® AS 40 (40 wt.-% silica in water) were added in a continuous manner. After 5 min, 2 g of polyethylene oxide were then added. After further kneading, 140 g of distilled water were then added, wherein 30 ml were added after 5 min, and after a further 5 min 20 ml were added, after a further 5 min 10 ml, after a further 5 min 10 ml, wherein the remaining 70 ml were then added continuously during 30 min under kneading. Such that the total duration of kneading was 65 min. The mixture was then extruded under a pressure of 110 bar into strands with a diameter of 1.5 mm, which were then dried for 4 hours at 120° C. and finally calcined at 490° C. for 5 hours using the following calcination program: 60 min to 120° C., 240 min at 120° C., 370 min from 120 to 490° C. and 300 min at 490° C., to afford extruded strands.

Example 5

100 g of TS-1 from Reference Example 5, 4 g of Methylcellulose (Walocel®), and 5.6 g of Aerosil® 200 were mixed together and kneaded for 5 min, after which 100.7 g of a polystyrene dispersion (33.1 wt.-% in water; average particle size 47.3 nm; pH=9.3) were continuously added under further kneading of the mixture. After 10 min, 56 g of Ludox® AS 40 (40 wt.-% silica in water) were added in a continuous manner. After a further 10 min, 1.33 g of polyethylene oxide were then added. After further kneading, 40 g of distilled water were then added, wherein 10 ml were added after 5 min and the remaining 30 ml were subsequently added in 10 ml portions in intervals of 5 min, respectively, such that the total duration of kneading was 45 min. The mixture was then extruded under a pressure of 150 bar into strands with a diameter of 1.5 mm, which were then dried for 4 hours at 120° C. and finally calcined at 490° C. for 5 hours using the following calcination program: 60 min to 120° C., 240 min at 120° C., 370 min from 120 to 490° C. and 300 min at 490° C., to afford extruded strands.

Example 6

90 g of TS-1 from Reference Example 4, 3.6 g of Methylcellulose (Walocel®), and 30 g of Aerosil® 200 were mixed together, wherein at first ¾ of the aforementioned components were mixed together and kneaded for 5 min, after which the remaining ¼ together with 50 ml of distilled water were added. After 10 min, 91 g of a polystyrene dispersion (33.1 wt.-% in water; average particle size 47.3 nm; pH=9.3) were continuously added under further kneading of the mixture. After 10 min, 1.2 g of polyethylene oxide were then added. After further kneading, 35 g of distilled water were then added, wherein 30 ml were added after 10 min and after a further 10 min the remaining 5 ml were then added, such that the total duration of kneading was 50 min. The mixture was then extruded under a pressure of 110 bar into strands with a diameter of 1.5 mm, which were then dried for 4 hours at 120° C. and finally calcined at 490° C. for 5 hours using the following calcination program: 60 min to 120° C., 240 min at 120° C., 370 min from 120 to 490° C. and 300 min at 490° C., to afford extruded strands.

Example 7

30 g of TS-1 from Reference Example 3 were kneaded with 1.14 g of Methylcellulose (Walocel®) for 5 min, after which 27.7 g of a polystyrene dispersion (33.5 wt.-% in water) were continuously added under further kneading of the mixture. After 10 min, 0.4 g of polyethylene oxide werd added in a continuous manner while further kneading, after which the resulting mixture was further mixed for 5 min, after which 16.1 g of Ludox® AS 40 (40 wt.-% silica in water) were then added. After further kneading for 10 min, the mixture was then extruded under a pressure of 80 bar into strands with a diameter of 1.7 mm, which were then dried for 4 hours at 120° C. and finally calcined at 490° C. for 5 hours to afford 27 g of extruded strands.

Example 8

100 g of TS-1 from Reference Example 2 were kneaded with 3.8 g of Methylcellulose (Walocel®) for 5 min, after which 99.5 g of a polystyrene dispersion (33.5 wt.-% in water) were continuously added under further kneading of the mixture. After 10 min, 40 g of Ludox® AS 40 (40 wt.-% silica in water) were added in a continuous manner while further kneading, after which the resulting mixture was further kneaded for 10 min, after which 1.3 g of polyethylene oxide were then added. After kneading for 5 min, 42.5 g of Ludox® AS 40 (40 wt.-% silica in water) were further added in a continuous manner, after which 10 g of TS-1 from Reference Example 2 were further added. After further kneading for 15 min, the mixture was extruded under a pressure of 87 bar into strands with a diameter of 1.7 mm, which were then dried for 4 hours at 120° C. and finally calcined at 500° C. for 5 hours to afford 114 g of extruded strands.

Example 9

100 g of TS-1 from Reference Example 1 were kneaded with 3.8 g of Methylcellulose (Walocel®) for 5 min, after which 99.5 g of a polystyrene dispersion (33.3 wt.-% in water; pH=9.1) were continuously added under further kneading of the mixture. After 10 min, 82.5 g of Ludox® AS 40 (40 wt.-% silica in water) were added in a continuous manner while further kneading, after which the resulting mixture was further mixed for 10 min, after which 1.3 g of polyethylene oxide were then added. Since the mixture is too wet for extrusion, a blow drier is used to reduce the water content thereof. After further kneading for 15 min, the mixture was then extruded under a pressure of 70-75 bar into strands with a diameter of 1.7 mm, which were then dried for 4 hours at 120° C. and finally calcined at 500° C. for 5 hours to afford 113 g of extruded strands.

Comparative Example 2

For comparison with the moldings obtained from Examples 1 to 9, a comparative sample was prepared from a mixture of 100 g of TS-1 zeolite from Comparative Example 1 with 64.8 g of Ludox® AS 40 (40 wt.-% silica in water), 99.3 g of a polystyrene dispersion (33.3 wt.-% in water), 4.1 g of Methylcellulose (Walocel®), 1.7 g of polyethylene oxide, and 31.7 g of distilled water, which after kneading for 45 min was extruded under a pressure of 70-75 bar into strands with a diameter of 1.7 mm, which were then dried for 4 hours at 120° C. and finally calcined at 500° C. for 5 hours to afford 113 g of extruded strands.

Hydrothermal Treatment

The moldings of Examples 1 to 9 and Comparative Example 2 were respectively subject to a water treatment procedure prior to the catalytic testing in order to increase their crush resistance. To this effect, 30 g of the respective molding sample and 600 g distilled water were placed in an autoclave which was then heated to 145° C. and held at that temperature for 8 h. The hydrothermally treated samples were then filtered, washed with distilled water, and blown dry with a nitrogen gas stream. The molding samples were then dried by heating to 120° C. during 1 h and held at that temperature for 16 h, after which the dried samples were calcined by heating thereof to 450° C. during 5.5 h, and held at that temperature for 2 h.

TABLE 2

Characteristics of the moldings from Examples 1 to 9 and Comparative Example 2 after hydrothermal treatment thereof

| Sample | zeolite $H_2O$ ads. [wt.-%] | pore volume [ml/g] | hardness [N] | BET [$m^2/g$] |
|---|---|---|---|---|
| Example 1 | 10 | 0.96 | 8.6 | 250 |
| Example 2 | 8 | 0.78 | 5 | 336 |
| Example 3 | 10 | 1.06 | 3.1 | 315 |
| Example 4 | 10 | 0.9 | 4.9 | 315 |
| Example 5 | 10 | 1 | 2.5 | 335 |
| Example 6 | 8 | 1.04 | 4 | 350 |
| Example 7 | 7.6 | 0.73 | n.a. | 325 |
| Example 8 | 7.6 | 0.67 | 2.7 | 312 |
| Example 9 | 2.9 | 0.63 | 7.3 | 329 |
| Comp. Ex. 2 | 10.2 | 0.9 | 5 | n.a. |

Thus, as may be taken from the results displayed in Table 2, it has surprisingly been found that it is possible to prepare moldings according to the inventive process which, despite the hydrophobic nature of the zeolite material reflected by the water adsorption capacity thereof, actually display characteristics which are comparable to those displayed by the molding according to Comparative Example 2 which contains a conventional TS-1 zeolite as the zeolitic material, in particular with respect to the water adsorption properties which it displays.

PFG NMR Self-Diffusion Analyses on Liquid-Saturated Moldings

Finally, the tortuosity parameter was determined for examples 1 to 3 and 5 to 9 and for Comparative Example 2 as described in the experimental section of US 2007/0099299 A1. In particular, the NMR analyses to this effect were conducted at 25° C. and 1 bar at 125 MHz $^1H$ resonance frequency with the FEGRIS NT NMR spectrometer (cf. Stallmach et al. in Annual Reports on NMR Spectroscopy 2007, Vol. 61, pp. 51-131) at the Faculty for Physics and Geological Sciences of the University of Leipzig. The pulse program used for the PFG NMR self-diffusion analyses was the stimulated spin echo with pulsed field gradients according to FIG. 1b of US 2007/0099299 A1. For each sample, the spin echo attenuation curves were measured at up to seven different diffusion times ($\Delta$/ms=7, 10, 12, 25, 50, 75, 100) by stepwise increase in the intensity of the field gradients ($g_{max}$=10 T/m). From the spin echo attenuation curves, the time dependence of the self-diffusion coefficient of the pore water was determined by means of equations (5) and (6) of US 2007/0099299 A1.

Calculation of the Tortuosity:

Equation (7) of US 2007/0099299 A1 was used to calculate the time dependency of the mean quadratic shift $\langle z^2(\Delta) \rangle = \frac{1}{3} \langle r^2(\Delta) \rangle$ from the self-diffusion coefficients $D(\Delta)$ thus determined. By way of example, in FIG. 2 of US 2007/0099299 A1, the data is plotted for exemplary catalyst supports of said document in double logarithmic form together with the corresponding results for free water. FIG. 2 of US 2007/0099299 A1 also shows in each case the best fit straight line from the linear fitting of $\langle r^2(\Delta) \rangle$ as a function of the diffusion time $\Delta$. According to equation (7) of US 2007/0099299 A1, its slope corresponds precisely to the value $6\bar{D}$ where $\bar{D}$ corresponds to the self-diffusion coefficient averaged over the diffusion time interval. According to equation (3) of US 2007/0099299 A1, the tortuosity is then obtained from the ratio of the mean self-diffusion coefficient of the free solvent ($D_0$) thus determined to the corresponding value of the mean self-diffusion coefficient in the molding. The tortuosity values as determined for the examples and comparative examples of the present experimental section are displayed in Table 3.

TABLE 3

Self-diffusion coefficients and tortuosities of the moldings from Examples 1 to 9 and Comparative Example 2 after hydrothermal treatment thereof

| Sample | water[1] (T = 298.15K) | | cyclooctane[2] (T = 298.15K) | | cyclooctane[3] (T = 308.15K) | |
| --- | --- | --- | --- | --- | --- | --- |
| | D | tortuosity | D | tortuosity | D | tortuosity |
| Example 1 | 1.13 | 2.0 ± 0.2 | 0.37 | 1.4 ± 0.1 | 0.52 | 1.2 ± 0.1 |
| Example 2 | 1.48 | 1.5 ± 0.1 | 0.34 | 1.6 ± 0.1 | 0.50 | 1.3 ± 0.1 |
| Example 3 | 1.43 | 1.6 ± 0.1 | 0.31 | 1.7 ± 0.1 | 0.40 | 1.5 ± 0.1 |
| Example 5 | 1.41 | 1.6 ± 0.2 | 0.33 | 1.6 ± 0.1 | 0.43 | 1.4 ± 0.1 |
| Example 6 | 1.53 | 1.5 ± 0.1 | 0.36 | 1.5 ± 0.1 | 0.48 | 1.3 ± 0.1 |
| Example 7 | 1.35 | 1.7 ± 0.1 | 0.35 | 1.5 ± 0.1 | 0.46 | 1.4 ± 0.1 |
| Example 8 | 1.38 | 1.6 ± 0.1 | 0.33 | 1.6 ± 0.1 | 0.44 | 1.4 ± 0.1 |
| Example 9 | 1.22 | 1.9 ± 0.2 | 0.30 | 1.8 ± 0.1 | 0.39 | 1.6 ± 0.1 |
| Comp. Ex. 2 | 1.46 | 1.6 ± 0.2 | 0.28 | 1.9 ± 0.1 | 0.36 | 1.7 ± 0.1 |

As may be taken from the results displayed in Table 3, it is noted that quite surprisingly the tortuosity values obtained relative to water for the inventive samples and for the sample from Comparative Example 2 are actually similar, although the zeolitic material contained in the inventive moldings are considerably more hydrophobic than conventional TS-1 contained in the sample according to Comparative Example 2. The peculiarity of the inventive samples due to the hydrophobicity of the zeolitic component is thus unexpectedly not apparent from the tortuosity relative to water, such that again, as for the aforementioned physical characteristics of the inventive moldings discussed in the foregoing, it has surprisingly been found that the moldings obtained according to the inventive process display physical properties similar to a conventional molding as obtained from Comparative Example 2.

The differences between the inventive samples and the molding according to Comparative Example 2 in fact only becomes apparent upon determining the tortuosity of the samples relative to a hydrophobic solvent such a cylclooctane used in the present case. More specifically, as may be taken from the results displayed in Table 3, the tortuosity values obtained using cyclooctane are all lower than the value obtained for the sample according to Comparative Example 2. This properly reflects the higher hydrophobicity of the zeolitic materials obtained in the former samples, Example 1 containing the zeolitic material with the highest hydrophobicity and accordingly showing the lowest tortuosity relative to cyclooctane of all samples.

Therefore, as discussed in the foregoing, the characteristics of the inventive materials are highly unexpected due to the fact that their physical and chemical characteristics do not reflect their higher hydrophobicity in a consequent fashion but rather only with respect to a few selected characteristics whereas the majority of their features are actually comparable to a molding containing a conventional zeolitic material, in particular with respect to the level of hydrophobicity which it displays. Consequently, it has quite surprisingly been found that the inventive materials would not appear to correspond to the sum of the features of their individual components, but that far more unexpected synergies are effective leading to the observed results. As a result, the inventive process and the materials obtainable therefrom offer novel perspectives with regard to their use and applications, in particular in the field of catalysis, due to the surprising combination of conventional and novel properties which they display.

The invention claimed is:
1. A process for the production of a molding, comprising:
   (I) providing a zeolitic material comprising hydrothermally preparing a TS-1 zeolite using a template consisting of greater than 88% to less 95% N-(2-propen-1-yl)-tri-n-propylammonium hydroxide and greater than 5% to less than 95% N-(1-propen-1-yl)-tri-n-propylammonium hydroxide;
   (II) mixing the zeolitic material provided in (I) with one or more binders;
   (III) kneading of the mixture obtained in (II);
   (IV) molding of the kneaded mixture obtained in (III) to obtain one or more moldings;
   (V) drying of the one or more moldings obtained in (IV); and
   (VI) calcining of the dried molding obtained in (V);
   wherein the zeolitic material provided in (I) displays a water adsorption ranging from 4 to 9 wt.-% when exposed to a relative humidity of 85%, wherein the water adsorption being measured under isothermal conditions at 25° C. until reaching equilibrium conditions when increasing the relative humidity from 5 to 85%.

2. The process of claim 1, wherein the one or more binders are selected from the group consisting of inorganic binders.

3. The process of claim 1, wherein the mixture obtained in (II) displays a weight ratio of the one or more binders to the zeolitic material (binder:zeolitic material) ranging from 0.1 to 0.6.

4. The process of claim 1, wherein (II) further comprises mixing the zeolitic material and the one or more binders with a solvent system, wherein the solvent system comprises one or more solvents.

5. The process of claim 4, wherein the mixture obtained in (II) displays a weight ratio of the solvent system to the zeolitic material (solvent system:zeolitic material) ranging from 0.7 to 1.7.

6. The process of claim 1, wherein (II) further comprises mixing the zeolitic material and the one or more binders with one or more pore forming agents.

7. The process of claim 6, wherein the mixture obtained in (II) displays a weight ratio of the one or more pore forming agents to the zeolitic material (pore forming agent: zeolitic material) ranging from 0.1 to 0.7.

8. The process of claim 6, wherein the mixture obtained in (II) displays a weight ratio of the solvent system to the one or more binders and pore forming agents to the zeolitic material (solvent system:binder and pore forming agent: zeolitic material) ranging from (0.7-1.7):(0.4-1):1.

9. The process of claim 1, wherein the calcining of the dried molding obtained in (V) is performed at a temperature ranging from 350 to 850° C.

10. The process of claim 1, further comprising:
    (VII) subjecting the calcined molding obtained in (VI) to a hydrothermal treatment.

11. The process of claim 10, wherein the hydrothermal treatment is performed with a water-containing solvent system and/or with an aqueous solution.

12. The process of claim 10, wherein the hydrothermal treatment is performed for a duration ranging from 1 to 48 hours.

13. A molding, obtained by a process according to claim 1.

14. A molding, wherein said molding contains a zeolitic material displaying a water adsorption ranging from 4 to 9 wt.-% when exposed to a relative humidity of 85%, wherein the zeolitic material comprises a hydrothermally prepared TS-1 zeolite prepared using a template consisting of greater than 88% to less 95 (N,N-(2-propen-1-yl)-tri-n-propylammonium hydroxide and greater than 5% to less than 95% N-(1-propen-1-yl)-tri-n-propylammonium hydroxide.

15. The molding of claim 14, wherein the zeolitic material has an MFI-type framework structure comprising $YO_2$ and optionally comprising $X_2O_3$, wherein Y is a tetravalent element, and X is a trivalent element, said material having an X-ray diffraction pattern comprising at least the following reflections:

| Intensity (%) | Diffraction angle 2θ/° [Cu K(alpha 1)] |
|---|---|
| 55-100 | 7.66-8.20 |
| 40-75 | 8.58-9.05 |
| 92-100 | 22.81-23.34 |
| 49-58 | 23.64-24.18 |
| 16-24 | 29.64-30.21 |
| 14-25 | 44.80-45.25 |
| 16-24 | 45.26-45.67 | wherein 100% relates to the intensity of the maximum peak in the X-ray powder diffraction pattern.

16. The molding of claim 15, wherein the $^{29}$Si MAS NMR of the zeolitic material comprises:
a first peak (P"1) in the range of from −110.4 to −114.0 ppm; and
a second peak (P"2) in the range of from −100.2 to −104.2 ppm.

17. The molding of claim 16, wherein the deconvoluted $^{29}$Si MAS NMR spectrum comprises one additional peak comprised in the range of from −113.2 to −115.2 ppm.

18. The molding of claim 15, wherein at least a portion of the Y atoms and/or of the X atoms in the MFI-type framework structure is isomorphously substituted by one or more elements.

19. The molding of claim 15, wherein a molar ratio of $YO_2$ to the one or more element ranges from 5 to 100.

20. The molding of claim 15, wherein the MFI-type framework structure of the zeolitic material does not contain $X_2O_3$.

21. The molding of claim 15, wherein Y is selected from the group consisting of Si, Sn, Ti, Zr Ge, and mixtures of two or more thereof.

22. The molding of claim 14, wherein the zeolitic material comprises one or more cation and/or cationic elements as ionic non-framework elements.

23. The molding of claim 14, wherein the molding further comprises one or more binders.

24. The molding of claim 14, wherein a BET surface area of the zeolitic material contained in the molding determined according to DIN 66131 ranges from 50 to 700 $m^2/g$.

25. The molding of claim 14, wherein a specific surface area of the molding determined according to DIN 66131 ranges from 50 to 700 $m^2/g$.

26. The molding of claim 14, wherein a pore volume of the molding determined according to DIN 66133 ranges from 0.1 to 2.5 ml/g.

27. The molding of claim 14, having a mechanical strength of from 1 to 15 N.

28. A process, comprising catalyzing a reaction with the molding of claim 14 wherein the reaction is selected from the group consisting of a reaction involving C—C bond formation, a reaction involving C—C bond conversion, an isomerization reaction, an ammoxidation reaction, a hydrocracking reaction, an alkylation reaction, an acylation reaction, a reaction for the conversion of alkanes to olefins, a reaction for the conversion of one or more oxygenates to olefins, a reaction for the conversion of one or more oxygenates to aromatics, an epoxidation reaction, a reaction for the epoxidation of olefins, a reaction for the epoxidation of $C_2$-$C_5$ alkenes, a reaction for the epoxidation of $C_2$-$C_4$ alkenes, and a reaction for the epoxidation of $C_2$ or $C_3$ alkenes.

* * * * *